(12) United States Patent
Mizuno et al.

(10) Patent No.: US 11,167,702 B2
(45) Date of Patent: Nov. 9, 2021

(54) WIRING MODULE, COMPOSITE WIRING MODULE, AND FIXING TARGET MEMBER EQUIPPED WITH WIRING MODULE

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Housei Mizuno, Mie (JP); Hiroki Hirai, Mie (JP); Haruka Nakano, Mie (JP); Motohiro Yokoi, Mie (JP); Shigeki Ikeda, Mie (JP); Daisuke Fukai, Mie (JP); Tetsuya Nishimura, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 90 days.

(21) Appl. No.: 16/605,638

(22) PCT Filed: Apr. 26, 2018

(86) PCT No.: PCT/JP2018/016979
§ 371 (c)(1),
(2) Date: Oct. 16, 2019

(87) PCT Pub. No.: WO2018/207641
PCT Pub. Date: Nov. 15, 2018

(65) Prior Publication Data
US 2020/0070749 A1    Mar. 5, 2020

(30) Foreign Application Priority Data

May 10, 2017  (JP) .............................. JP2017-094012
Aug. 28, 2017 (JP) .............................. JP2017-163554

(51) Int. Cl.
*C09J 7/21* (2018.01)
*C09J 7/38* (2018.01)
(Continued)

(52) U.S. Cl.
CPC ............. *B60R 16/0215* (2013.01); *C09J 7/21* (2018.01); *C09J 7/38* (2018.01); *H01B 7/40* (2013.01);
(Continued)

(58) Field of Classification Search
CPC ......... C09J 7/02; C09J 7/21; C09J 7/38; C09J 2301/124; C09J 2301/18; C09J 2203/00;
(Continued)

(56) References Cited

U.S. PATENT DOCUMENTS 5,211,784 A * 5/1993 Haibach .................. B32B 27/12
156/152
5,278,356 A * 1/1994 Miller .................... H02G 3/266
174/117 A
(Continued)

FOREIGN PATENT DOCUMENTS

CN     201185530    1/2009
CN     102915687 A  2/2013
(Continued)

OTHER PUBLICATIONS

International Search Report issued in International Bureau of Wipo Patent Application No. PCT/JP2018/016979, dated Jun. 19, 2018 (with English translation).
(Continued)

*Primary Examiner* — Timothy J Thompson
*Assistant Examiner* — Michael F Mcallister
(74) *Attorney, Agent, or Firm* — Greenblum & Bernstein, P.L.C.

(57) ABSTRACT

A wiring module includes a wiring body including at least one conductive wiring, an pressure-sensitive adhesive part
(Continued)

provided on the wiring body, and a peeling part, provided on the wiring body, to which the pressure-sensitive adhesive part sticking in a manner easily peeled from the peeling part.

18 Claims, 18 Drawing Sheets

(51) Int. Cl.
*H01B 7/40* (2006.01)
*H02G 3/30* (2006.01)
*B60R 16/02* (2006.01)

(52) U.S. Cl.
CPC ............ *H02G 3/30* (2013.01); *C09J 2203/00* (2013.01); *C09J 2301/124* (2020.08); *C09J 2301/18* (2020.08)

(58) Field of Classification Search
CPC ....... B32B 33/00; B60R 16/0215; H01B 7/40; H02G 3/30
USPC .......................................... 428/41.8; 174/68.1
See application file for complete search history.

(56) References Cited

U.S. PATENT DOCUMENTS

| | | | |
|---|---|---|---|
| 5,798,012 A * | 8/1998 | Krane | B60R 16/0215 156/290 |
| 6,385,885 B1 * | 5/2002 | Valiulis | A47F 5/0815 283/81 |
| 10,189,289 B2 | 1/2019 | Kato et al. | |
| 10,276,278 B2 * | 4/2019 | Kawaguchi | H01B 7/0045 |
| 2010/0051189 A1 * | 3/2010 | Kawabata | H05K 3/007 156/247 |
| 2010/0118554 A1 * | 5/2010 | Kraus, Jr. | H02G 3/24 362/396 |
| 2013/0034678 A1 * | 2/2013 | Yamamoto | G09F 7/00 428/41.8 |
| 2015/0027623 A1 | 1/2015 | Malloy et al. | |
| 2015/0035202 A1 * | 2/2015 | Takeda | H01L 21/561 264/271.1 |
| 2015/0053478 A1 | 2/2015 | Kawaguchi et al. | |
| 2015/0380916 A1 | 12/2015 | Shimada et al. | |
| 2016/0381793 A1 * | 12/2016 | Yasuda | H05K 3/4682 174/251 |
| 2017/0213618 A1 | 7/2017 | Kawaguchi et al. | |
| 2020/0108589 A1 | 4/2020 | Malloy et al. | |

FOREIGN PATENT DOCUMENTS

| | | |
|---|---|---|
| CN | 104137360 A | 11/2014 |
| CN | 105556193 A | 5/2016 |
| CN | 205890236 U | 1/2017 |
| JP | 43-7072 | 3/1968 |
| JP | 52-161274 | 12/1977 |
| JP | 60-129014 | 8/1985 |
| JP | H09-149529 A | 6/1987 |
| JP | H07-245016 A | 9/1995 |
| JP | 2000-335329 | 12/2000 |
| JP | 2013-058620 A | 3/2013 |
| JP | 2016-139551 A | 8/2016 |
| JP | 2016-210339 | 12/2016 |
| WO | 2014/136565 a1 | 9/2014 |

OTHER PUBLICATIONS

Indian Office Action, Indian Patent Office, Application No. 201917044653, dated Sep. 1, 2020.
Chinese Office Action, Chinese Patent Office, Application No. 201880028336.5, dated Sep. 2, 2020, with English translation.
Chinese Office Action, Chinese Patent Office, Application No. 201880028336.5, dated Apr. 23, 2021, English translation.
Japanese Office Action, Japanese Patent Office, Application No. 2020-114895, dated Jun. 22, 2021, English translation.

* cited by examiner

F I G. 6
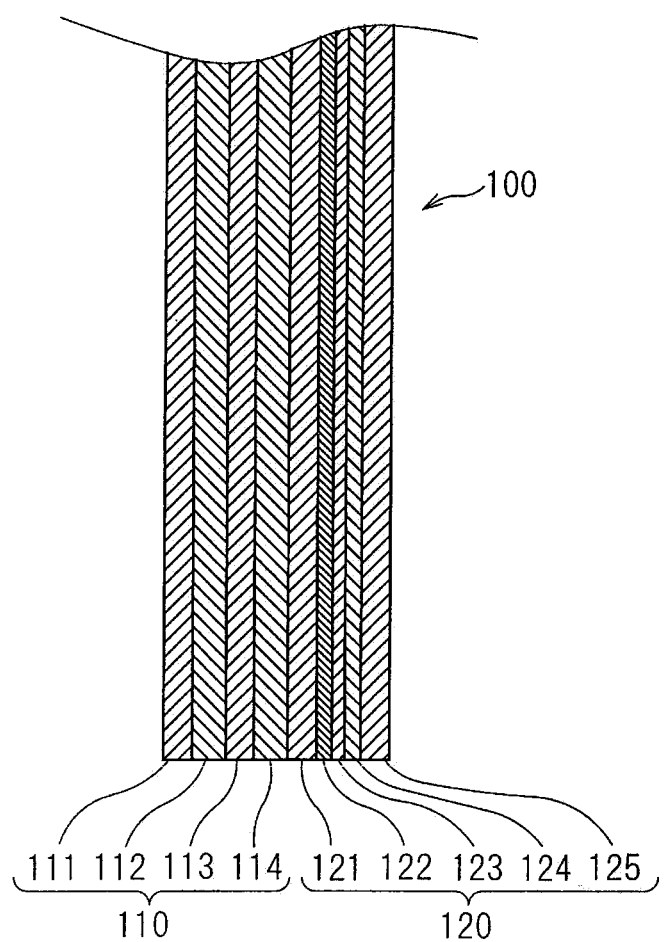

FIG. 10
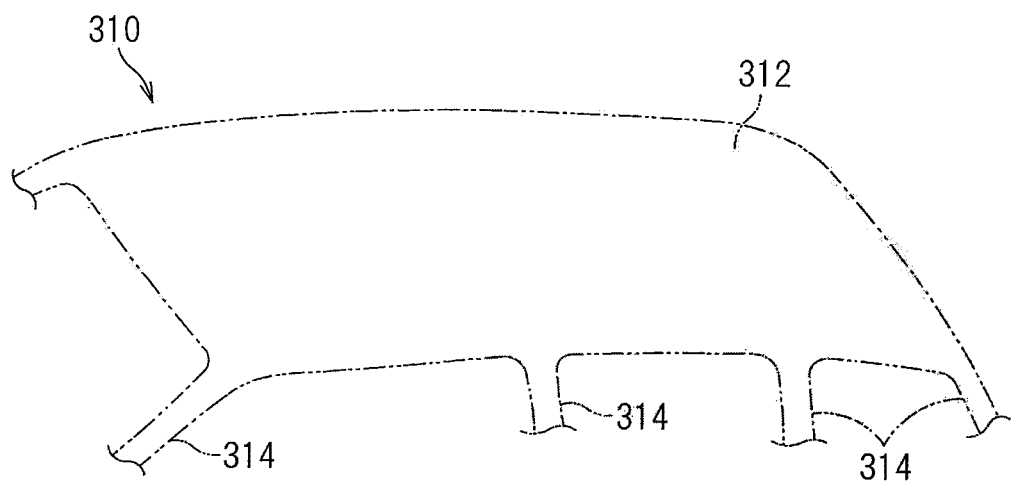
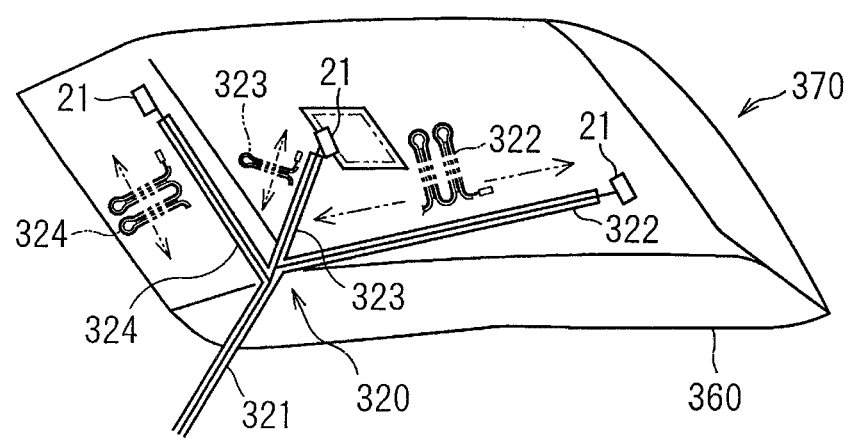

WIRING MODULE, COMPOSITE WIRING MODULE, AND FIXING TARGET MEMBER EQUIPPED WITH WIRING MODULE

TECHNICAL FIELD

The present invention relates to a technique for fixing a wiring module to a fixing target member.

BACKGROUND ART

Patent Document 1 discloses that a roof harness is fixed to a roof lining by a hot-melt material or an pressure-sensitive adhesive tape.

PRIOR ART DOCUMENTS

Patent Documents

Patent Document 1: Japanese Patent Application Laid-Open No. 2000-335329

SUMMARY

Problem to be Solved by the Invention

However, when a roof harness is fixed to a roof lining by a hot-melt material or an pressure-sensitive adhesive tape, an operation of applying the hot-melt material or an operation of cutting and attaching the pressure-sensitive adhesive tape needs to be performed in an area for a fixing operation.

When a double-sided tape is used as the pressure-sensitive adhesive tape and the double-sided tape is attached to the roof harness in advance, the operation of attaching the double-sided tape to the roof harness needs not be performed. However, in this case, an operation of peeling a release paper from the double-sided tape needs to be performed. There is a problem that the release paper ends up in the garbage.

An object of the present invention is to provide a technique capable of easily performing an operation of fixing a wiring module to a fixing target member in an area for a fixing operation and reducing a generation of garbage.

Means to Solve the Problem

In order to solve the above problem, a wiring module according to a first aspect includes a wiring body including at least one conductive wiring, an pressure-sensitive adhesive part provided on the wiring body, and a peeling part, provided on the wiring body, to which the pressure-sensitive adhesive part sticking in a manner easily peeled from the peeling part.

The wiring module according to a second aspect is the wiring module according to the first aspect, wherein the peeling part is attached to a part of the wiring body other than a part where the peeling part sticks to the pressure-sensitive adhesive part.

The wiring module according to a third aspect is the wiring module according to the first or second aspect, wherein the pressure-sensitive adhesive part is partially provided on the wiring body, and the peeling part is partially provided on a part of the wiring body other than a part where the pressure-sensitive adhesive part is provided.

The wiring module according to a fourth aspect is the wiring module according to the third aspect, wherein the wiring body has a flat shape, and the pressure-sensitive adhesive part is provided to planarly spread on one main surface of the wiring body.

The wiring module according to a fifth aspect is the wiring module according to the third or fourth aspect, wherein the pressure-sensitive adhesive part and the peeling part are provided on different parts in the wiring body in an extension direction of the wiring body.

The wiring module according to a sixth aspect is the wiring module according to the fifth aspect, wherein a plural sets of the pressure-sensitive adhesive part and the peeling part are provided on different parts in the wiring body in an extension direction of the wiring body.

The wiring module according to a seventh aspect is the wiring module according to the fifth or sixth aspect, wherein there is an interval between the pressure-sensitive adhesive part and the peeling part sticking to each other.

The wiring module according to an eighth aspect is the wiring module according to the seventh aspect, wherein a part of the wiring body between the pressure-sensitive adhesive part and the peeling part sticking to each other is curved and bent back.

The wiring module according to a ninth aspect is the wiring module according to any one of the third to eighth aspects, wherein in a set of the pressure-sensitive adhesive part and the peeling part sticking to each other, another peeling part is provided adjacent to the pressure-sensitive adhesive part and another pressure-sensitive adhesive part is provided adjacent to the peeling part, and the another peeling part and the another pressure-sensitive adhesive part stick to each other in a manner peelable from each other.

The wiring module according to a tenth aspect is the wiring module according to the first or second aspect, wherein the wiring body includes a sheet-like member including a sheet body part to which the at least one conductive wiring is fixed and an extension piece extending from at least one side portion of the sheet body part, and is formed into a flat shape as a whole, one of the pressure-sensitive adhesive part and the peeling part is provided on one main surface of the sheet body part and another one of the pressure-sensitive adhesive part and the peeling part is provided on the extension piece, and the peeling part sticks to the pressure-sensitive adhesive part in a manner easily peeled from the pressure-sensitive adhesive part in a state where the extension piece is bent.

The wiring module according to an eleventh aspect is the wiring module according to the first or second aspect, wherein the wiring body includes a sheet-like member to which the at least one conductive wiring is fixed, and is formed into a flat shape as a whole, and one of the pressure-sensitive adhesive part and the peeling part is provided on one main surface of the sheet-like member, another one of the pressure-sensitive adhesive part and the peeling part is attached to the sheet-like member while extending from one side portion of the sheet-like member, and the peeling part sticks to the pressure-sensitive adhesive part in a manner easily peeled from the pressure-sensitive adhesive part in a state where a part of the pressure-sensitive adhesive part and the peeling part extending from one side portion of the sheet-like member is bent.

The wiring module according to a twelfth aspect is the wiring module according to the first, second, or eleventh aspect, wherein a joint part is provided on a part of one main surface of the peeling part, and the pressure-sensitive adhesive part is provided on a part of another main surface of the peeling part, and in a state where the peeling part is attached to the wiring body with the joint part therebetween, the peeling part is bent and a part of the another main surface of the peeling part where the pressure-sensitive adhesive part is not provided sticks to the pressure-sensitive adhesive part in a manner peelable from the pressure-sensitive adhesive part.

The wiring module according to a thirteenth aspect includes the wiring module according to the tenth or eleventh aspect as a base wiring module and the wiring module according to the tenth or eleventh aspect as an additional wiring module, wherein at least a part of the additional wiring module is disposed along the base wiring module in a state where a part of the additional wiring module protruding to an outside of the wiring body is made to correspond to a part of the base wiring module extending to an outside of the wiring body.

A wiring module according to a fourteenth aspect includes a wiring body including at least one conductive wiring, an pressure-sensitive adhesive part provided on the wiring body, and a peeling part, provided on the wiring body, to which the pressure-sensitive adhesive part can stick in a manner easily peeled from the peeling part.

The wiring module according to a fifteenth aspect is the wiring module according to the fourteenth aspect, wherein the pressure-sensitive adhesive part is partially provided on the wiring body, and the peeling part is partially provided on a part of the wiring body other than a part where the pressure-sensitive adhesive part is provided.

A fixing target member equipped with a wiring module according to a sixteenth aspect includes the wiring module according to the fourteenth or fifteenth aspect and a fixing target member to which the wiring body is fixed with the pressure-sensitive adhesive part therebetween while the peeling part remains on the wiring body.

Effects of the Invention

The wiring module according to the first aspect includes an pressure-sensitive adhesive part provided on the wiring body and a peeling part, provided on the wiring body, to which the pressure-sensitive adhesive part sticking in a manner easily peeled from the peeling part. Thus, it is applicable to peel the pressure-sensitive adhesive part from the peeling part and fix the pressure-sensitive adhesive part to the fixing target member when the wiring module is fixed to the fixing target member. Thus, an operation of fixing the wiring module to the fixing target member can be easily performed in an area for a fixing operation. The peeling part can remain on the wiring body even in the state after the peeling operation is performed, thus a generation of garbage can be reduced.

According to the second aspect, the peeling part is attached to a part of the wiring body other than a part where the peeling part sticks to the pressure-sensitive adhesive part, thus the peeling part keeps being attached to the wiring body even in the state after the peeling operation is performed. A generation of garbage can be thereby reduced.

According to the third aspect, the pressure-sensitive adhesive part is partially provided on the wiring body, the peeling part is partially provided on a part of the wiring body other than a part where the pressure-sensitive adhesive part is provided, and the pressure-sensitive adhesive part and the peeling part stick to each other in a manner easily peeled from each other. Thus, it is applicable to peel the pressure-sensitive adhesive part from the peeling part and fix the pressure-sensitive adhesive part to the fixing target member when the wiring module is fixed to the fixing target member. Thus, an operation of fixing the wiring module to the fixing target member can be easily performed in an area for a fixing operation. The peeling part can remain on the wiring body, thus a generation of garbage can be reduced.

According to the fourth aspect, the wiring body can be fixed to the fixing target member with the pressure-sensitive adhesive part therebetween with as large area as possible.

According to the fifth aspect, it is possible that the wiring body is bent so that a length thereof in an extension direction is reduced and the pressure-sensitive adhesive part and the peeling part stick to each other. Thus, the wiring module can made to have a compact form.

According to the sixth aspect, it is possible that the wiring body is bent at a plurality of parts so as to reduce the length of the wiring body in the extension direction and the pressure-sensitive adhesive part and the peeling part stick to each other. Thus the wiring module can be further made to have a compact form.

According to the seventh aspect, the sharp bending at the part of the wiring body between the pressure-sensitive adhesive part and the peeling part sticking to each other can be reduced, thus the conductive wiring is hardly bent sharply.

According to the eighth aspect, the part of the wiring body between the pressure-sensitive adhesive part and the peeling part sticking to each other is curved and bent back, thus the conductive wiring is hardly bent sharply.

According to the ninth aspect, the part of the wiring body where the pressure-sensitive adhesive part is provided can be fixed to the fixing target member with the pressure-sensitive adhesive part therebetween. The part of the wiring body where the peeling part is provided can be fixed to the fixing target member with the other pressure-sensitive adhesive part adjacent to the peeling part therebetween. Thus, the wiring module can be firmly fixed to the fixing target member.

According to the tenth aspect, it is applicable to peel the pressure-sensitive adhesive part from the peeling part and fix the pressure-sensitive adhesive part to the fixing target member when the wiring module is fixed to the fixing target member. Thus, an operation of fixing the wiring module to the fixing target member can be easily performed in an area for a fixing operation. The peeling part remains on the sheet body part or the extension piece, thus a generation of garbage can be reduced.

According to the eleventh aspect, it is applicable to peel the pressure-sensitive adhesive part from the peeling part and fix the pressure-sensitive adhesive part to the fixing target member when the wiring module is fixed to the fixing target member. Thus, an operation of fixing the wiring module to the fixing target member can be easily performed in an area for a fixing operation. The peeling part keeps being connected to the sheet-like member, thus a generation of garbage can be reduced.

According to the twelfth aspect, when the peeling part is attached to the wiring body with the joint part therebetween, the pressure-sensitive adhesive part is also attached to the wiring body. Thus, the pressure-sensitive adhesive part and the peeling part can be easily attached to the wiring body.

According to the thirteenth aspect, at least a part of the additional wiring module is disposed along the base wiring module in a state where a part of the additional wiring module protruding to an outside of the wiring body is made to correspond to a part of the base wiring module extending to an outside of the wiring body. Thus, when the additional wiring module is added to the base wiring module, a positional relationship between them can be set as constant as possible.

According to the fourteenth aspect, the pressure-sensitive adhesive part is provided on the wiring body, and the peeling part to which the pressure-sensitive adhesive part can stick in a manner easily peeled from the peeling part is provided on the wiring body, thus the pressure-sensitive adhesive part and the peeling part can stick to each other in a manner easily peeled from each other. Thus, it is applicable to peel the pressure-sensitive adhesive part from the peeling part and fix the pressure-sensitive adhesive part to the fixing target member when the wiring module is fixed to the fixing target member. Thus, an operation of fixing the wiring module to the fixing target member can be easily performed in an area for a fixing operation. The peeling part can remain on the wiring body, thus a generation of garbage can be reduced.

According to the fifteenth aspect, the pressure-sensitive adhesive part is partially provided on the wiring body, the peeling part is partially provided on a part of the wiring body other than a part where the pressure-sensitive adhesive part is provided, and the pressure-sensitive adhesive part and the peeling part stick to each other in a manner easily peeled from each other. Thus, it is applicable to peel the pressure-sensitive adhesive part from the peeling part and fix the pressure-sensitive adhesive part to the fixing target member when the wiring module is fixed to the fixing target member. Thus, an operation of fixing the wiring module to the fixing target member can be easily performed in an area for a fixing operation. The peeling part can remain on the wiring body, thus a generation of garbage can be reduced.

According to the sixteenth aspect, it is applicable to peel the pressure-sensitive adhesive part from the peeling part and fix the pressure-sensitive adhesive part to the fixing target member when the wiring module is fixed to the fixing target member. Thus, an operation of fixing the wiring module to the fixing target member can be easily performed in an area for a fixing operation. The peeling part remains on the wiring body, thus a generation of garbage can be reduced.

BRIEF DESCRIPTION OF DRAWINGS

FIG. 6 A diagram illustrating an example of a composite adhesive tape appropriate to constitute an pressure-sensitive adhesive part and a peeling part.

FIG. 10 A diagram illustrating an example of a fixing target member equipped with a wiring module.

DESCRIPTION OF EMBODIMENT(S)

Figure 1:
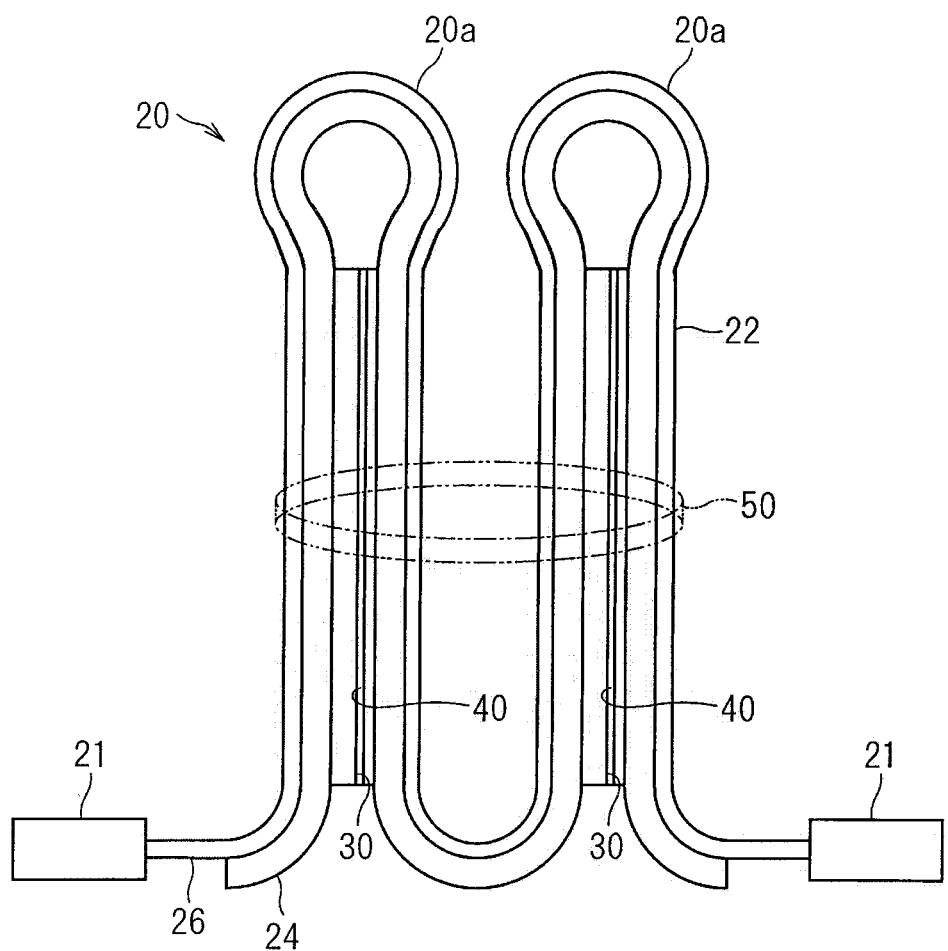
FIG. 1 A schematic side view illustrating a wiring module according to an embodiment.

A wiring module according to embodiments is described hereinafter. The wiring module includes a wiring body, an pressure-sensitive adhesive part, and a peeling part.

The wiring body includes at least one conductive wiring. Assumed as the wiring body are, for example, one electrical wire, a plurality of bound electrical wires, a plurality of electrical wires integrated to have a flat form, at least one electrical wire fixed to a sheet to have a flat form as a whole.

The pressure-sensitive adhesive part is a part provided on the wiring body and having pressure-sensitive adhesion. The pressure-sensitive adhesive part sticks to the fixing target member, thus the wiring body is fixed to the fixing target member.

The peeling part is a part provided on the wiring body, and the pressure-sensitive adhesive part sticks to the peeling part in the manner easily peeled from the peeling part. The peeling part keeps sticking to the pressure-sensitive adhesive part in a state before the wiring module is fixed to the fixing target member, thus reduced is that the pressure-sensitive adhesive part sticks to a part other than the fixing target member in storing and transporting the wiring module, for example. The peeling part is provided on the wiring body. The peeling part is preferably attached to a part of the wiring body other than the part where the peeling part sticks to the pressure-sensitive adhesive part. Accordingly, achievable is a configuration that the pressure-sensitive adhesive part is not separated from the wiring body but remains on the wiring body in a state where the peeling part is peeled from the pressure-sensitive adhesive part. In a state where the peeling part does not stick to the pressure-sensitive adhesive part, it is considered that the peeling part is a part provided on the wiring body and the part to which the pressure-sensitive adhesive part can stick in the manner easily peeled from the part.

A configuration that the wiring body is fixed to the fixing target member with the pressure-sensitive adhesive part therebetween while the peeling part remains on the wiring body is referred to as a fixing target member equipped with a wiring module.

According to the wiring module or the fixing target member equipped with the wiring module, it is applicable to peel the pressure-sensitive adhesive part from the peeling part and make the pressure-sensitive adhesive part stick to the fixing target member to fix it when the wiring module is fixed to the fixing target member. Thus, the operation of fixing the wiring module to the fixing target member can be easily performed in an area for a fixing operation. The peeling part can remain on the wiring body even in the state after the peeling part is peeled, thus a generation of garbage can be reduced.

More specific aspects are described in each embodiment described hereinafter.

First Embodiment

A wiring module and a fixing target member equipped with a wiring module according to a first embodiment are described hereinafter.

FIG. 1 is a schematic side view illustrating a wiring module 20. The wiring module 20 includes a wiring body 22, an pressure-sensitive adhesive part 30, and a peeling part 40.

The wiring body 22 includes at least one conductive wiring (a core wire 27 herein). The wiring body 22 is formed into a flat shape herein.

More specifically, the wiring body 22 includes a sheet-like member 24 and at least one electrical wire 26, and is configured to have a band-like sheet shape as a whole. Furthermore specifically, the at least one electrical wire 26 is fixed to a side of one main surface of the sheet-like member 24. Herein, the plurality of electrical wires 26 are parallelly fixed to the one main surface of the sheet-like member 24.

Figure 2:
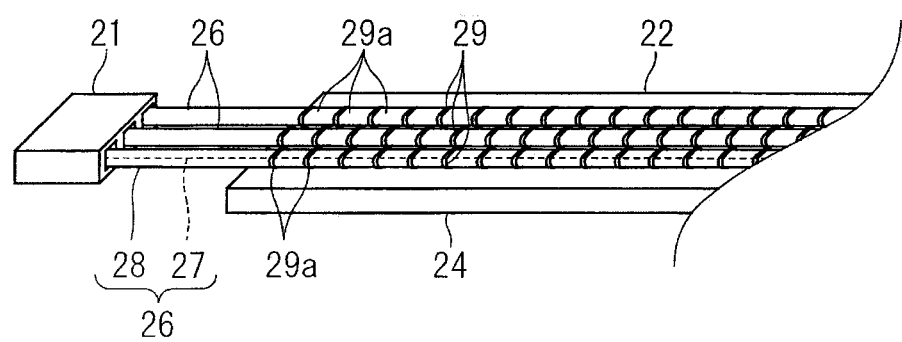
FIG. 2 A schematic perspective view illustrating an example of a wiring body.

A configuration illustrated in FIG. 2, for example, can be adopted as the wiring body 22. The wiring body 22 includes the sheet-like member 24, the at least one electrical wire 26, and a thread 29.

The sheet-like member 24 is formed of a sheet material such as polyvinyl chloride (PVC), polypropylene (PP), or a nonwoven fabric. The sheet-like member 24 is formed into an elongated band-like shape.

The at least one electrical wire 26 is disposed on the side of the one main surface of the sheet-like member 24. Herein, the plurality of electrical wires 26 are parallelly disposed on the side of the one main surface of the sheet-like member 24. The electrical wires 26 are insulated electrical wires 26 each including a core wire 27 and an insulating covering 28 for covering the core wire 27 (see FIG. 2). The core wire 27 is a line like member made of a conductive material such as copper or aluminum. The core wire 27 may be a solid wire or a stranded wire. The insulating covering 28 may be formed by extrusion molding, for example, a resin around the core wire 27 or by applying, for example, varnish around the core wire 27 and baking the varnish (for example, an enamel wire).

The electrical wire 26 may be used as a signal wire or a power wire.

Ends of the electrical wires 26 are incorporated into connectors 21. Herein, a terminal connected to the ends of the electrical wires 26 by crimping is inserted into a cavity of the connector 21. While the wiring module 20 is disposed in a fixing target member in a vehicle, etc., the connectors 21 on the ends of each electrical wire 26 are connected to connectors of various electrical devices mounted on the vehicle, for example. The wiring module 20 is used as a wiring for electrically connecting the various electrical devices mounted on the vehicle, for example.

The connectors may include pressure contact terminals pressed and connected a onto the electrical wires. Herein, the connectors 21 are attached to the ends of the electrical wires 26 extending from the sheet-like member 24, however, the connectors may be fixed to the sheet-like member. Adoptable as a configuration of fixing the connectors to the sheet-like member is a configuration of sewing the connectors to the sheet-like member, a configuration of dividing each connector and sandwiching an end portion of the sheet-like member by the divided connectors, and a configuration of joining the connectors to the sheet-like member by ultrasonic welding, a double-sided tape, or an adhesive agent, for example.

The electrical wires 26 are sewn to the sheet-like member 24 by the thread 29. In the example illustrated in FIG. 2, all of the plurality of electrical wires 26 are sewn to the sheet-like member 24 by the thread 29. Some of the plurality of electrical wires 26 may be sewn to the sheet-like member 24 by the thread 29.

In the example illustrated in FIG. 2, the plurality of electrical wires 26 are linearly and parallelly sewn to the sheet-like member 24 by the thread 29, however, all or some of the plurality of electrical wires may be curvedly disposed. The plurality of electrical wires may be halfway branched. The end of the branched electrical wire in the plurality of electrical wires may be incorporated into a connector different from a connector into which the end of the other electrical wire is incorporated. The plurality of electrical wires may stack vertically halfway or may intersect with each other.

The threads 29 are preferably components more flexible than the electric wires 26. The thread 29 preferably has a tensile strength higher than that of the electric wires 26. The thread 29 may be made of a natural fiber or a chemical fiber. The thread 29 may be a single yarn or a twisted yarn.

When the thread 29 may abut the surrounding components while being incorporated into a vehicle, the thread 29 preferably has abrasion resistance as high as, for example, a fishing line made of nylon or polyester etc.

Herein, the one seamless thread 29 is adopted as the thread 29 for sewing the one electrical wire 26, and the electrical wire 26 is sewn in a plurality of positions along an extension direction of the electrical wire 26 with the single thread 29. In this case, the one thread 29 extends along a side of the other main surface of the sheet-like member 24, and partially passes through to the side of the one main surface of the sheet-like member 24 to form a loop 29a. Then, the electrical wire 26 is disposed in the loop 29a, thus the electrical wire 26 is sewn to the sheet-like member 24.

It is not necessary to sew the one electrical wire 26 with the one seamless thread 29. The thread 29 with which the electrical wire 26 is partly sewn in one position and which is then cut in both of the ends may exist in a plurality of portions along the extension direction of the electrical wires 26.

Each of the plurality of electrical wires 26 is sewn to the sheet-like member 24 by the thread 29, thus the plurality of electrical wires 26 are parallelly fixed to the sheet-like member 24. The plurality of electrical wires may be collectively sewn to the sheet-like member by the thread.

Figure 3:
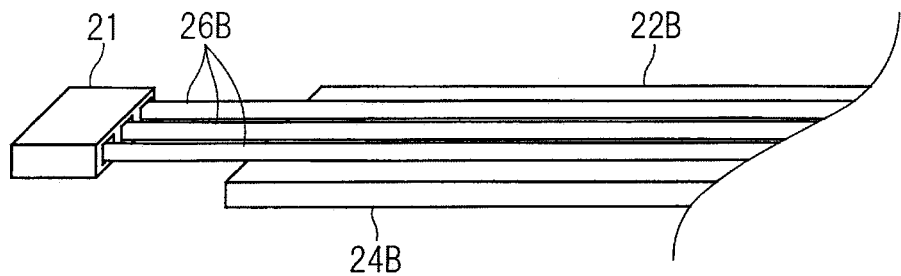
FIG. 3 A schematic perspective view illustrating another example of the wiring body.

A wiring body 22B according to a modification example illustrated in FIG. 3, for example, can be adopted as the wiring body 22 having the flat shape. The wiring body 22B includes a sheet-like member 24B and at least one electrical wire 26B.

When a difference in the wiring body 22B from the wiring body 22 is mainly described, the at least one electrical wire 26B is joined to the sheet-like member 24B in the wiring body 22B.

The electrical wire 26B can be joined to the sheet-like member 24B by welding such as ultrasonic welding, resistance welding, or laser welding, bonding by an adhesive agent, and pressure-sensitive adhesion by a double-sided tape, for example.

Usable as the wiring body having the flat shape are the wiring body having the above configuration, a flat cable in which an extrusion covering with a resin is performed on bare electrical wires which are parallelly arranged, and a flat cable in which bare conductive wirings or electrical wires which are parallelly arranged are sandwiched by a pair of films, for example.

The wiring body needs not necessarily have the flat shape, but the wiring body may be made up of a plurality of electrical wires which are bound so that a cross section thereof has a circular shape. Even in such a case, the pressure-sensitive adhesive part and the peeling part can stick to a peripheral surface thereof.

Figure 4:
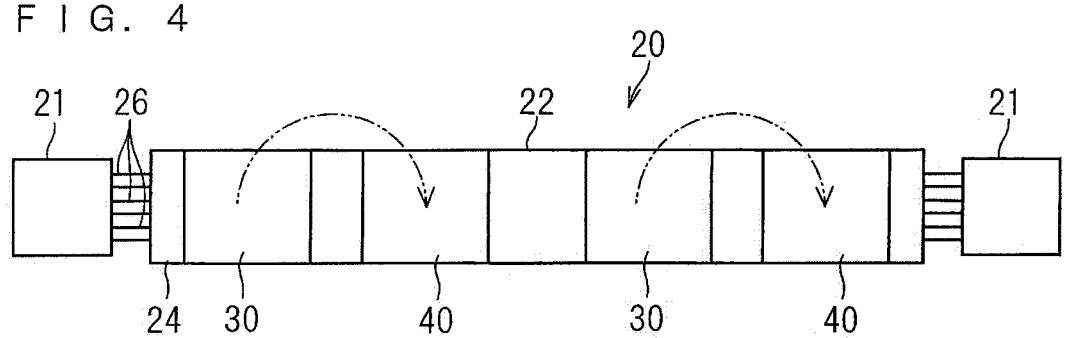
FIG. 4 A schematic bottom view illustrating a state where the wiring module is spread.

FIG. 4 is a schematic bottom view illustrating a state where the wiring module 20 is spread.

As illustrated in FIG. 1 and FIG. 4, the pressure-sensitive adhesive part 30 is partially disposed on the wiring body 22.

The pressure-sensitive adhesive part 30 is a part having pressure-sensitive adhesion in a part contacting the wiring body 22 and also having pressure-sensitive adhesion in an opposite part thereof. Herein, the pressure-sensitive adhesive part 30 is formed into a sheet-like shape having two surface, both of which have pressure-sensitive adhesion. Herein, the pressure-sensitive adhesive part 30 is formed into a rectangular shape, however, a circular shape and an oval shape, for example, are also applicable. The pressure-sensitive adhesive part 30 partially sticks to the other main surface of the wiring body 22 (a surface located opposite to that to which the electrical wire 26 is fixed), thus is planarly spread. The pressure-sensitive adhesive part may be joined to the wiring body by welding or bonding, for example. The pressure-sensitive adhesive part may be formed by applying a gluing agent in a fluid state on the wiring body.

The peeling part 40 is partially provided on a part of the wiring body 22 other than the part where the pressure-sensitive adhesive part 30 is provided. The peeling part 40 has pressure-sensitive adhesion in a part contacting the wiring body 22, and has properties in an opposite part thereof that the pressure-sensitive adhesive part 30 can stick to the peeling part 40 in the manner easily peeled from the peeling part 40. Herein, the state where the pressure-sensitive adhesive part 30 sticks to the peeling part 40 in the manner easily peeled from the peeling part 40 indicates a state where, for example, the pressure-sensitive adhesive part 30 sticks to the peeling part 40 so that the pressure-sensitive adhesive part 30 can be peeled from the peeling part 40 before the joining between the pressure-sensitive adhesive part 30 and the peeling part 40 sticking to the wiring body 22 is released when a force of peeling the adhesion of the pressure-sensitive adhesive part 30 and the peeling part 40 is applied on the wiring body 22. Herein, the peeling part 40 is formed into a sheet-like shape in which one main surface has pressure-sensitive adhesion and processing enabling the easy peeling by a silicon resin, for example, is performed on the other main surface. Herein, the peeling part 40 is formed into a rectangular shape, however, a circular shape and an oval shape, for example, are also applicable. Preferably, the peeling part 40 spreads into the same shape over the same area as those of the pressure-sensitive adhesive part 30, but may spread over the larger area than that of the pressure-sensitive adhesive part 30.

The peeling part 40 partially sticks to the other main surface of the wiring body 22 (a surface located opposite to that to which the electrical wire 26 is fixed), thus is planarly spread. The peeling part may be joined to the wiring body by welding or bonding, for example. The peeling part may be formed by directly applying a material in a fluid state, such as a silicon resin which can be easily peeled, on the wiring body.

The pressure-sensitive adhesive part 30 sticks to the peeling part 40 in the manner peelable from the peeling part 40, thus the wiring body 22 is kept in a bent state. Accordingly, the wiring body 22 maintains a compact form appropriate for storage and transportation.

When the pressure-sensitive adhesive part 30 and the peeling part 40 are provided on the different parts in the wiring body 22, the pressure-sensitive adhesive part 30 sticks to the peeling part 40, thus the wiring module 20 can be kept in a bent state so as to maintain the compact form.

As an example, a preferable arrangement region of the pressure-sensitive adhesive part 30 and the peeling part 40 is as follows.

Firstly, the pressure-sensitive adhesive part 30 and the peeling part 40 are provided on the different parts in the wiring body 22 in an extension direction thereof (herein, an extension direction of the electrical wire 26).

Accordingly, the wiring body 22 can be bent so as to reduce a dimension thereof in the extension direction, thus it is possible to effectively make the wiring module 20 into the compact form.

When the dimension of the wiring body is large in a width direction, the pressure-sensitive adhesive part and the peeling part may be provided on the different parts in the wiring body 22 in a width direction thereof. Accordingly, when the pressure-sensitive adhesive part sticks to the peeling part, the wiring module can be kept in a bent state so as reduce the dimension thereof in the width direction The pressure-sensitive adhesive part and the peeling part can be provided in optional positions in accordance with the shape of the wiring body and the direction in which the wiring body is bent to expect the compact form.

Each of the pressure-sensitive adhesive part 30 and the peeling part 40 has the shape spreading over the wiring body 22 in the whole width direction to make an adhesion area of the pressure-sensitive adhesive part 30 as large as possible, however, this configuration is not necessary.

A plural sets of the pressure-sensitive adhesive part 30 and the peeling part 40 are provided on the different parts in the wiring body 22 in the extension direction thereof.

In the example illustrated in FIG. 1 and FIG. 4, the pressure-sensitive adhesive part 30 and the peeling part 40 as a set are provided on the different parts in a region closer to one end side of the wiring body 22 in the extension direction. The pressure-sensitive adhesive part 30 and the peeling part 40 as a set are provided on the different parts in a region closer to the other end side of the wiring body 22 in the extension direction.

Thus, the pressure-sensitive adhesive part 30 sticks to the peeling part 40 in each set, thus each of the region on the one end side of the wiring body 22 and the region on the other end side of the wiring body 22 can be kept in a state of being bent back, and the wiring body 22 having the elongated shape can be further made to have the compact form.

It is also applicable that a part of the wiring body 22 between the region closer to the one end side having the bent-back form and the region closer to the other end side also having the bent-back form is bent back and formed into an accordion form as a whole, and those regions are bound by a binding member 50 (see an alternate long and two short dashes line in FIG. 1) such as a rubber band and an adhesive tape. These regions may keep sticking to each other with the pressure-sensitive adhesive part and the peeling part therebetween in the manner similar to the configuration described above. In this case, the pressure-sensitive adhesive part may be left as a region which does not contribute to the fixation to the fixing target member.

There is an interval between the pressure-sensitive adhesive part 30 and the peeling part 40 sticking to each other. The interval between the pressure-sensitive adhesive part 30 and the peeling part 40 is optionally set, but is preferably set to such an extent that a sharp bending does not occur in the electrical wire 26 between the pressure-sensitive adhesive part 30 and the peeling part 40 in a state where the pressure-sensitive adhesive part 30 sticks to the peeling part 40.

There is the interval between the pressure-sensitive adhesive part 30 and the peeling part 40, thus a part 20a of the wiring body 22 between the pressure-sensitive adhesive part 30 and the peeling part 40 is curved and bent back while the pressure-sensitive adhesive part 30 sticks to the peeling part 40. Thus, the wiring body 22, in particular, the electrical wire 26 is free from being folded. FIG. 1 illustrates a state where the part 20a is curved with a uniform curvature radius, however, the part 20a may be practically bent with various curvature radii.

Figure 5:
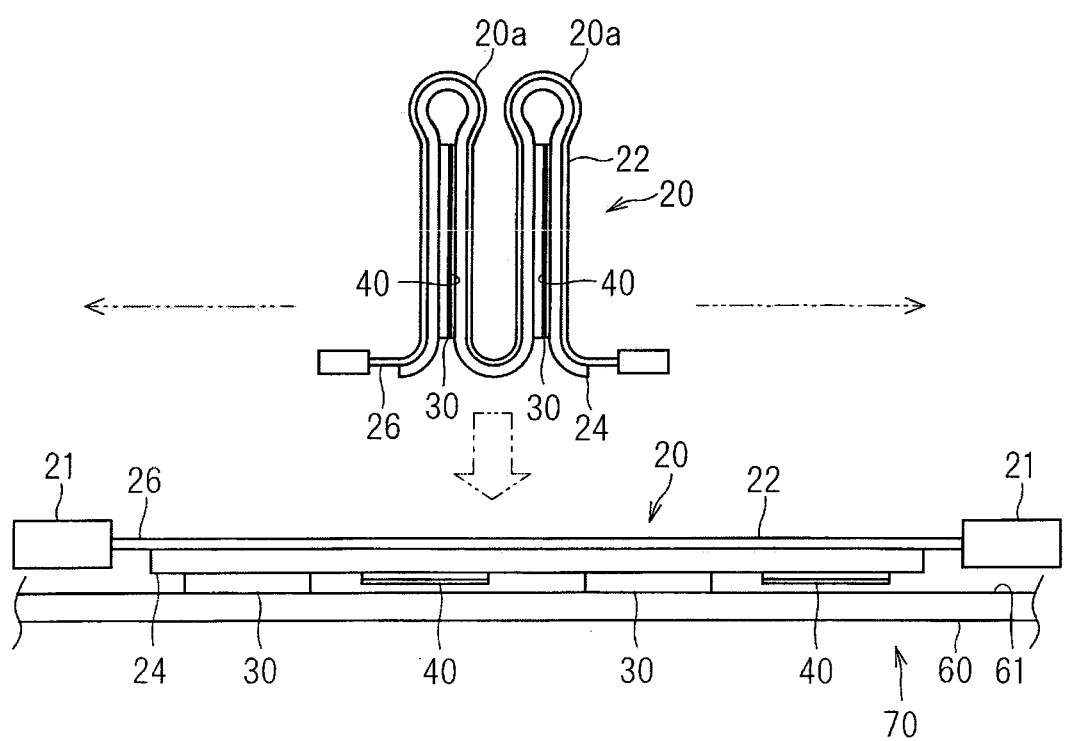
FIG. 5 A diagram illustrating an example of an operation of fixing the wiring module to a fixing target member.

FIG. 5 is a diagram illustrating an example of an operation of fixing the wiring module 20 described above to a fixing target member 60.

That is to say, in manufacturing, storing, and transporting the wiring module 20 described above, the pressure-sensitive adhesive part 30 sticks to the peeling part 40, thus the wiring module 20 is kept in a state being bent into the compact form. The wiring module 20 having the above configuration is brought close to the fixing target member 60 at a time of a fixing operation of fixing the wiring module 20 to the fixing target member 60. The fixing target member 60 is a panel-like member, and has a fixing target surface 61 to which the wiring module 20 is fixed. The fixing target surface 61 may be a planar surface or a curved surface.

Then, a worker, for example, brings the wiring module 20 which is kept bent on the fixing target member 60, and pulls the wiring module 20 in a direction of releasing the adhesion between the pressure-sensitive adhesive part 30 and the peeling part 40. Herein, the worker pulls both end portions of the wiring body 22 in a direction away from each other. Then, the adhesion between the pressure-sensitive adhesive part 30 and the peeling part 40 is released, and the wiring module 20 is spread in an elongated shape. In the spread wiring module 20, an outward surface of the pressure-sensitive adhesive part 30 is exposed to the other main surface of the wiring body 22, and the outward surface has pressure-sensitive adhesion. In this state, the worker places the wiring module 20 along a predetermined electrical wire path on the fixing target surface 61, and presses the wiring module 20 onto the fixing target surface 61. Then, the pressure-sensitive adhesive part 30 is pressed onto the fixing target surface 61 and sticks to the fixing target surface 61. Accordingly, the wiring module 20 is fixed to the fixing target member 60 in a position along the predetermined electrical wire path. A fixing target member 70 equipped with a wiring module is thereby manufactured.

According to the wiring module 20 and the fixing target member 70 equipped with the wiring module having the above configuration, the pressure-sensitive adhesive part 30 is partially provided on the wiring boy 22, the peeling part 40 is partially provided on the part of the wiring body 22 other than the part where the pressure-sensitive adhesive part 30 is provided, and the pressure-sensitive adhesive part 30 sticks to the peeling part 40 in the manner easily peeled from the peeling part 40. Thus, in fixing the wiring module 20 to the fixing target member 60, the pressure-sensitive adhesive part 30 is peeled from the peeling part 40, and the pressure-sensitive adhesive part 30 is fixed to the fixing target member 60. Thus, the wiring body 22 can be fixed to the fixing target member 60 using the pressure-sensitive adhesive part 30 without performing an operation of applying a hot-melt material on the fixing target surface 61 or an operation of cutting and attaching an adhesive tape in an area for the fixing operation, and the fixing operation can be easily performed. The peeling part 40 can remain on the wiring body 22, thus a generation of garbage can be reduced in the area for the fixing operation.

The wiring body 22 has the flat shape, and the pressure-sensitive adhesive part 30 is provided to be planarly spread on the wiring body 22. Thus, the wiring body 22 can be fixed to the fixing target member 60 with the pressure-sensitive adhesive part 30 therebetween with as large area as possible, and the wiring body 22 can be firmly fixed to the fixing target member 60.

The pressure-sensitive adhesive part 30 and the peeling part 40 are provided on the different parts in the wiring body 22 in the extension direction, thus it is possible that the wiring body 22 is bent so that the length thereof in the extension direction is reduced and the pressure-sensitive adhesive part 30 sticks to the peeling part 40. Thus, the wiring module 20 can made to have the compact form, which is convenient for storage and transportation, for example.

The plural sets of the pressure-sensitive adhesive part 30 and the peeling part 40 are provided on the different parts in the wiring body 22 in the extension direction thereof, thus it is possible that the wiring body 22 is bent at a plurality of parts so as to further reduce the length of the wiring body 22 in the extension direction and each pressure-sensitive adhesive part 30 sticks to the corresponding peeling part 40. Thus, the wiring module 20 can made to have the further compact form, which is more convenient for storage and transportation, for example.

There is the interval between the pressure-sensitive adhesive part 30 and the peeling part 40, thus the sharp bending at the part of the wiring body 22 between the pressure-sensitive adhesive part 30 and the peeling part 40 sticking to each other can be reduced. Herein, the part of the wiring body 22 between the pressure-sensitive adhesive part 30 and the peeling part 40 sticking to each other is bent back to be curved. Thus, the electrical wire 26 including the conductive wiring is hardly bent sharply.

The part of the wiring body 22 between the pressure-sensitive adhesive part 30 and the peeling part 40 sticking to each other may be folded.

Various modification examples and the like are described based on a premise of the first embodiment described above.

FIG. 6 is a diagram illustrating an example of a composite adhesive tape 100 appropriate to constitute the pressure-sensitive adhesive part 30 and the peeling part 40 described above.

The composite adhesive tape 100 includes an pressure-sensitive adhesive part-forming part 110 and a peeling part-forming part 120.

The pressure-sensitive adhesive part-forming part 110 has a configuration that a first peeling layer 111, a first pressure-sensitive adhesive layer 112, a first base material 113, and a second pressure-sensitive adhesive layer 114 are stacked in this order. The first base material 113 is a paper or resin band-like base material, for example. The first pressure-sensitive adhesive layer 112 is provided on one main surface of the first base material 113. The first pressure-sensitive adhesive layer 112 is an pressure-sensitive adhesive layer sticking to the wiring body 22. The first peeling layer 111 is provided on an outer surface side of the first pressure-sensitive adhesive layer 112 in a state before the composite adhesive tape 100 is attached to the wiring body 22. The second pressure-sensitive adhesive layer 114 is provided on the other main surface of the first base material 113. The second pressure-sensitive adhesive layer 114 is an pressure-sensitive adhesive layer sticking to the peeling part-forming part 120.

The peeling part-forming part 120 has a configuration that a second peeling layer 121, a third pressure-sensitive adhesive layer 122, a second base material 123, a fourth pressure-sensitive adhesive layer 124, and a third peeling layer 125 are stacked in this order. The second base material 123 is a paper or resin band-like base material, for example. The third pressure-sensitive adhesive layer 122 is provided on one main surface of the second base material 123. The third pressure-sensitive adhesive layer 122 sticks to the second peeling layer 121. The second pressure-sensitive adhesive layer 114 sticks to the second peeling layer 121 from an opposite side of the third pressure-sensitive adhesive layer 122. Processing enabling an easy peeling by a silicon resin, for example, is performed on a surface of the second peeling layer 121 to which the second pressure-sensitive adhesive layer 114 sticks, thus the second pressure-sensitive adhesive layer 114 can be easily peeled from the second peeling layer 121. The fourth pressure-sensitive adhesive layer 124 is provided on the other main surface of the second base material 123. The fourth pressure-sensitive adhesive layer 124 is an pressure-sensitive adhesive layer sticking to the wiring body 22. The third peeling layer 125 sticks to an outer surface side of the fourth pressure-sensitive adhesive layer 124 in a state before the composite adhesive tape 100 is attached to the wiring body 22.

Preferably, an pressure-sensitive adhesive force of the first peeling layer 111 on the first pressure-sensitive adhesive layer 112 and an pressure-sensitive adhesive force of the third peeling layer 125 on the fourth pressure-sensitive adhesive layer 124 are weaker than that of the second peeling layer 121 on the second pressure-sensitive adhesive layer 114, and an pressure-sensitive adhesive force of the second peeling layer 121 on the second pressure-sensitive adhesive layer 114 is weaker than an pressure-sensitive adhesive force or a joining force between the other layers.

Figure 7:
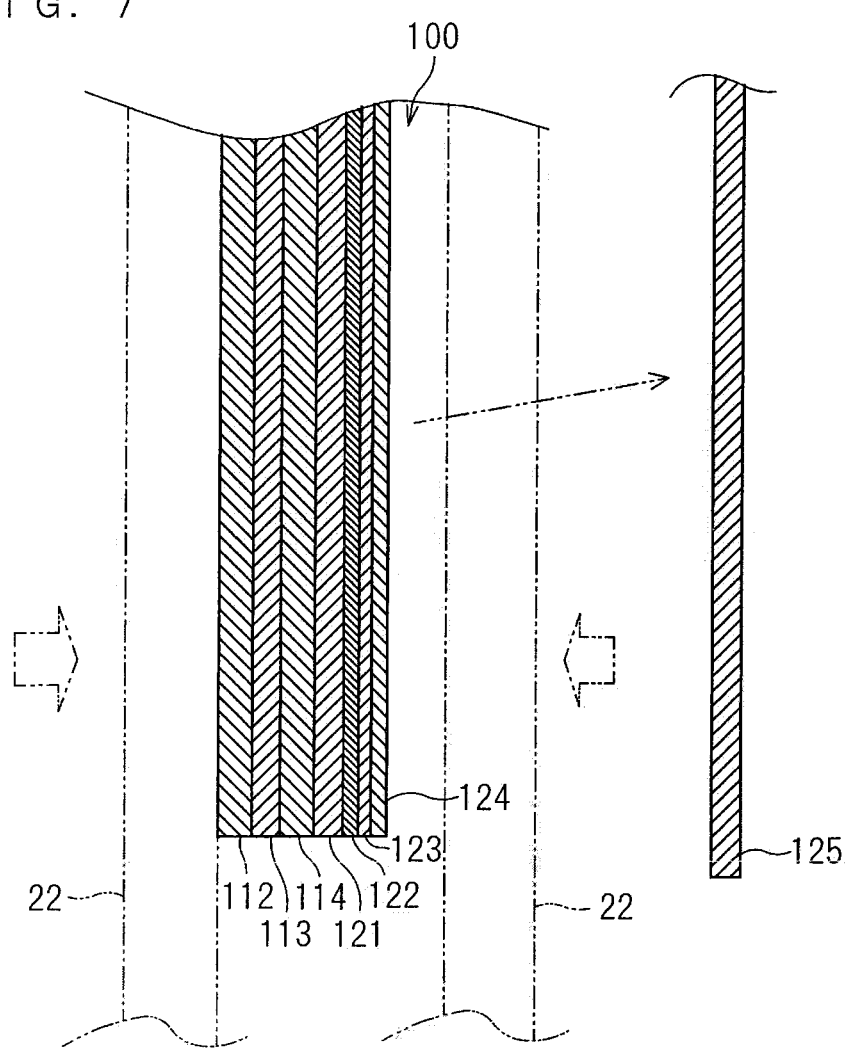
FIG. 7 A diagram illustrating an example of a procedure of manufacturing the wiring module using the composite adhesive tape.

The wiring module 20 can be manufactured as follows using the composite adhesive tape 100 described above, for example. Firstly, as illustrated in FIG. 7, the first peeling layer 111 is peeled, and the first pressure-sensitive adhesive layer 112 sticks to the wiring body 22. Subsequently, the third peeling layer 125 is peeled, and the fourth pressure-sensitive adhesive layer 124 also sticks to the other part of the wiring body 22. The first peeling layer 111 and the third peeling layer 125 described above have the pressure-sensitive adhesion force weaker than that between the other layers, thus the operation of peeling the first peeling layer 111 and the third peeling layer 125 can be easily performed without peeling the other layers. The wiring module 20 can be thereby manufactured.

When the wiring module 20 is fixed to the fixing target member 60, the both end portions of the wiring body 22 are pulled to be away from each other to peel the second peeling layer 121 from the second pressure-sensitive adhesive layer 114. The pressure-sensitive adhesion force of the second peeling layer 121 on the second pressure-sensitive adhesive layer 114 is weaker than the pressure-sensitive adhesion force or the joining force between the other layers, thus the operation of peeling the second peeling layer 121 from the second pressure-sensitive adhesive layer 114 can be easily performed without peeling the other layers.

The wiring module 20 can be easily manufactured using the composite adhesive tape 100 described above.

Figure 8:
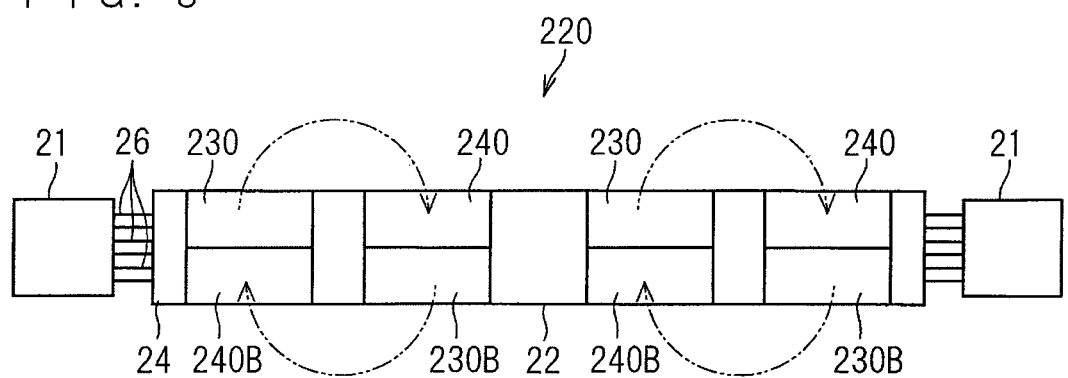
FIG. 8 A schematic bottom view illustrating a state where the wiring module according to a modification example is spread.

In a wiring module 220 illustrated in FIG. 8, an pressure-sensitive adhesive part 230 and a peeling part 240 sticking to each other are provided in the manner similar to the embodiment described above. A configuration of the wiring module 220 is different from that in the embodiment described above in that the other peeling part 240B is provided adjacent to the pressure-sensitive adhesive part 230 and the other pressure-sensitive adhesive part 230B is provided adjacent to the peeling part 240.

More specifically, the wiring module 220 includes the wiring body 22, the pressure-sensitive adhesive part 230, and the peeling part 240. The pressure-sensitive adhesive part 230 and the peeling part 240 are provided on the parts similar to those in the embodiment described above in the extension direction of the wiring body 22.

The pressure-sensitive adhesive part 230 and the peeling part 240 are smaller in width than the pressure-sensitive adhesive part 30 and the peeling part 40 in the embodiment described above. Herein, the pressure-sensitive adhesive part 230 and the peeling part 240 are provided in a region ranging from one end side to a center of the wiring body 22 in the width direction.

The other peeling part 240B is provided adjacent to the pressure-sensitive adhesive part 230, herein, in a region ranging from the other end side to the center of the wiring body 22 in the width direction.

The other pressure-sensitive adhesive part 230B is provided adjacent to the peeling part 240, herein, in a region ranging from the other end side to the center of the wiring body 22 in the width direction.

Then, the other pressure-sensitive adhesive part 230B sticks to the other peeling part 240B in the manner peelable from the peeling part 240B in a region adjacent to the pressure-sensitive adhesive part 230 and the peeling part 240 sticking to each other.

Figure 9:
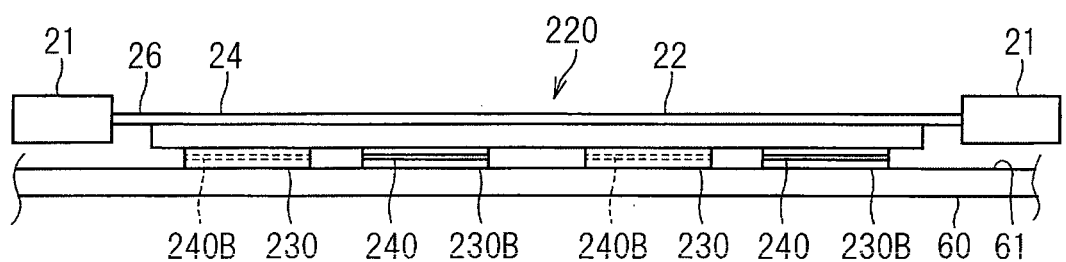
FIG. 9 A diagram illustrating the above wiring module fixed to the fixing target member.

When the wiring module 220 described above is fixed to the fixing target member 60, as illustrated in FIG. 9, a part of the wiring body 22 where the pressure-sensitive adhesive part 230 is provided sticks to the fixing target member 60 by the pressure-sensitive adhesive part 230. A part of the wiring body 22 adjacent to a part where the peeling part 240 is provided sticks to the fixing target member 60 by the other pressure-sensitive adhesive part 230B.

Thus, the wiring module 220 can be firmly fixed to the fixing target member 60 at more parts.

In the example described above, the other peeling part 240B and the other pressure-sensitive adhesive part 230B have a symmetrical shape to the pressure-sensitive adhesive part 230 and the peeling part 240 with respect to a center line of the wiring body 22 in the width direction, however, this configuration is not necessary. Herein, each of the pressure-sensitive adhesive part 230, the peeling part 240, the other peeling part 240B and the other pressure-sensitive adhesive part 230B is formed into a rectangular shape, however, a circular shape and an oval shape, for example, are also applicable.

FIG. 10 is a drawing illustrating an example of applying the wiring module 20 (or 220) described above as a wiring module 320 for a roof lining 360 which is an example of the fixing target member.

That is to say, a roof 310 in a vehicle includes a roof body 312 and the roof lining 360.

The roof body 312 constitutes a part covering an upper side of a vehicle interior in a vehicle body constituting a basic shape of the vehicle, and is formed into a planar shape of a metal, for example. A pillar 314 supporting the roof body 312 is provided at each corner of the roof body 312.

The roof lining 360 is a planar part formed of a resin, for example, and is formed into a planar shape covering an inner surface side of the roof body 312 described above.

In a state where the roof lining 360 is attached to the inner surface side of the roof body 312, a gap is provided between the roof lining 360 and the inner surface side, and the wiring module 320 is disposed in the gap.

At least one electrical device is attached to the roof lining 360. Assumed as the electrical device are a room lamp, a switch, and a camera, for example.

The roof lining 360 is an example of the fixing target member, and the wiring module 320 is attached to an upper surface of the roof lining 360.

The wiring module 320 includes a wiring part 321 wired through the pillar 314 and branch wiring parts 322, 323, and 324 branched at an end portion of the wiring part 321 located on a side of the roof body 312. The wiring part 321 and the branch wiring parts 322, 323, and 324 are preferably formed into a shape branched and connected by one sheet-like member. The sheet-like member may be separated between the wiring part 321 and the branch wiring parts 322, 323, and 324. The wiring part 321 and the branch wiring parts 322, 323, and 324 may be connected via a connector, for example.

Each of the branch wiring parts 322, 323, and 324 has a configuration similar to the wiring module 20 (or 220) described above, and the connector 21 is provided on an end portion thereof located opposite to the wiring part 321. Each of the branch wiring parts 322, 323, and 324 is bent to have a compact form as described above in a state before each of the branch wiring parts 322, 323, and 324 is fixed on the roof lining 360. Then, as described above, the wiring module 320 is spread on the roof lining 360 and fixed on the roof lining 360 with the pressure-sensitive adhesive part 30 (see the embodiment described above) therebetween. A roof lining 370 equipped with a wiring module, which is the fixing target member equipped with the wiring module, is thereby manufactured. The connector 21 is connected to various electrical devices at the end portion of the spread wiring module 320.

Second Embodiment

A wiring module and a fixing target member equipped with a wiring module according to a second embodiment are described.

Figure 11:
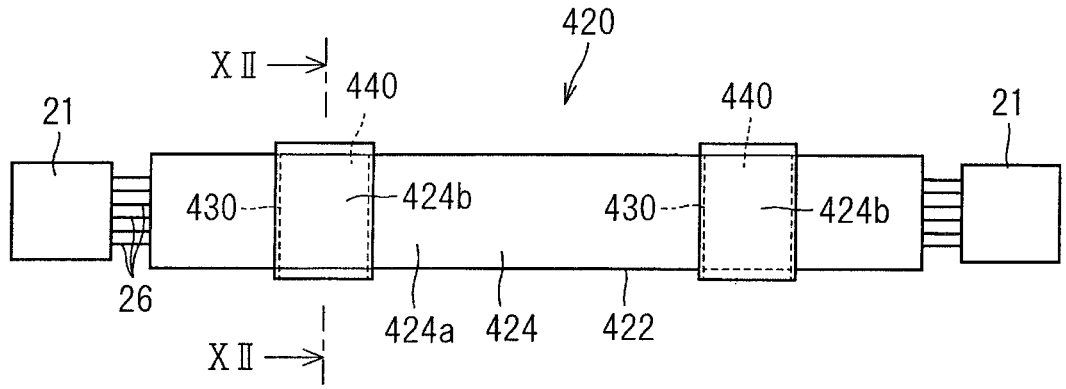
FIG. 11 A schematic bottom view illustrating a wiring module according to a second embodiment.
Figure 12:
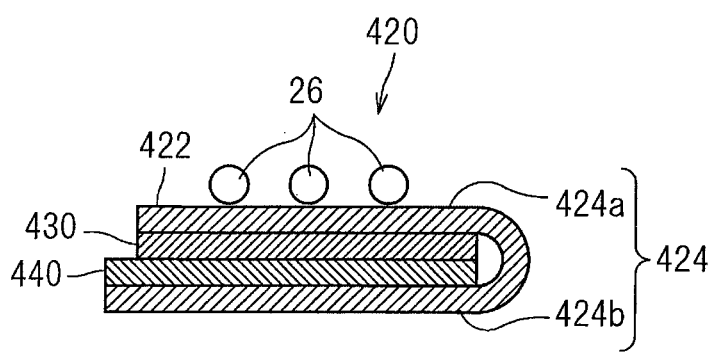
FIG. 12 A schematic cross-sectional view along an XII-XII line in FIG. 11.
Figure 13:
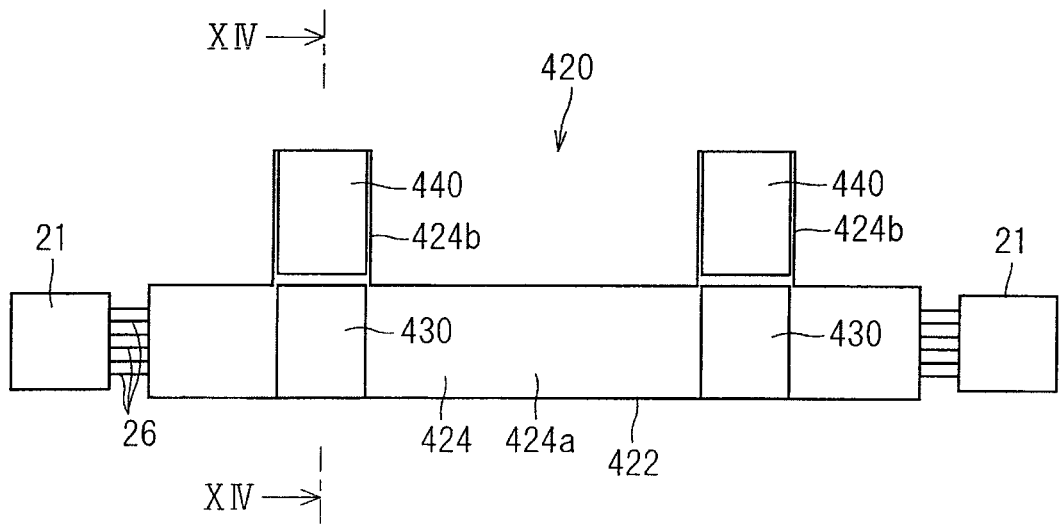
FIG. 13 A schematic bottom view illustrating a state where the wiring module is spread.
Figure 14:
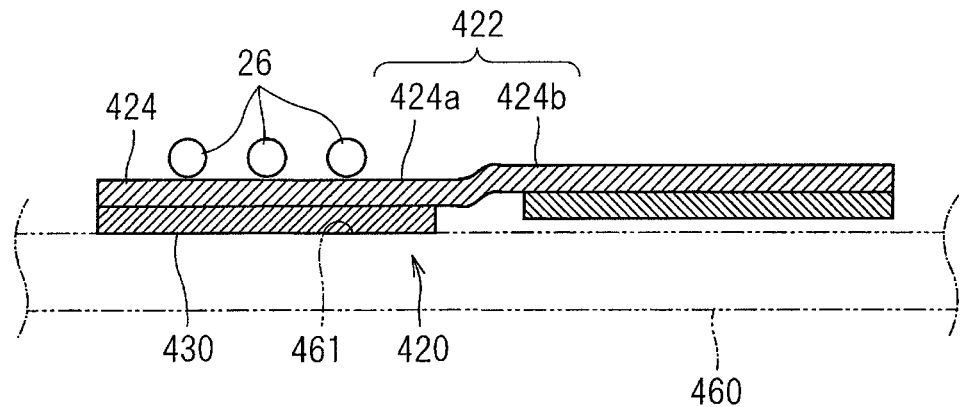
FIG. 14 A schematic cross-sectional view along an XIV-XIV line in FIG. 13.

FIG. 11 is a schematic bottom view illustrating a wiring module 420, FIG. 12 is a schematic cross-sectional view along an XII-XII line in FIG. 11, FIG. 13 is a schematic bottom view illustrating a state where the wiring module 420 is spread, and FIG. 14 is a schematic cross-sectional view along an XIV-XIV line in FIG. 13. In the following description of the present embodiment, the same reference numerals are assigned to the similar constituent elements described in the first embodiment, and the description thereof may be omitted in some cases.

The wiring module 420 includes a wiring body 422, an pressure-sensitive adhesive part 430, and a peeling part 440.

The wiring body 422 includes a sheet-like member 424 and at least one electrical wire 26, and is formed into a flat shape as a whole.

The sheet-like member 424 includes a sheet body part 424a and an extension piece 424b. The sheet-like member 424 is formed of a sheet material such as polyvinyl chloride (PVC), polypropylene (PP), or a nonwoven fabric being cut into a shape including the sheet body part 424a and the extension piece 424b described above.

The sheet body part 424a is a part to which the at least one electrical wire 26 is fixed. Herein, the sheet body part 424a is formed into an elongated band-like shape. The at least one electrical wire 26 (the plurality of electrical wires 26 herein) is fixed to the sheet body part 424a along an extension direction thereof. The electrical wire 26 can be fixed to the sheet body part 424a by sewing with a thread, welding such as ultrasonic welding, resistance welding, or laser welding, bonding by an adhesive agent, and pressure-sensitive adhesion by a double-sided tape, for example, as described in the above first embodiment.

The sheet body part 424a may be bent at a middle part thereof in the extension direction to have an L shape, a V shape, or a U shape, for example. Herein, the plurality of electrical wires 26 are parallelly fixed to the sheet body part 424a, however, at least one of the plurality of electrical wires 26 may be halfway bent and fixed to the sheet body part 424a.

The extension piece 424b is formed to extend outward from at least one side portion of the sheet body part 424a. Herein, the plurality of (two, herein) extension pieces 424b extend outward from one side portion of the sheet body part 424a. A width dimension and protrusion dimension of the extension piece 424b are set to such an extent that the extension piece 424b, which is folded back at a base end portion thereof toward the sheet body part 424a, can cover the whole pressure-sensitive adhesive part 430 provided on the sheet body part 424a. Herein, the protrusion dimension of the extension piece 424b is set larger (slightly larger) than the width dimension of the sheet body part 424a.

The pressure-sensitive adhesive part 430 is a member similar to the pressure-sensitive adhesive part 30 described in the first embodiment. Herein, the pressure-sensitive adhesive part 430 sticks to a region in the sheet body part 424a over the whole width direction in a partial position in one main surface of the sheet body part 424a in the extension direction. In the manner similar to the configuration described in the first embodiment described above, the pressure-sensitive adhesive part 430 may be joined to the sheet body part 424a by welding or bonding, or may be formed by applying a gluing agent in a fluid state on the wiring body. Herein, the pressure-sensitive adhesive part 430 is provided on a plurality of (two, herein) partial positions in the sheet body part 424a in the extension direction.

The peeling part 440 is a member similar to the peeling part 40 described in the first embodiment. Herein, the peeling part 40 is provided on a part of the wiring body 422 other than a part where the peeling part 440 sticks to the pressure-sensitive adhesive part 430, more specifically, one main surface of the extension piece 424b. Herein, the peeling part 440 is formed into a shape capable of covering the whole pressure-sensitive adhesive part 430. Herein, a width direction dimension of the peeling part 440 is set to be the same as a width direction dimension of the pressure-sensitive adhesive part 430 (the dimension of the sheet body part 424a in the extension direction), and a length dimension of the peeling part 440 is set larger than a length dimension of the pressure-sensitive adhesive part 430 (a dimension of the sheet body part 424a in the width direction). The peeling part 440 may be joined to the extension piece 424b by welding or bonding, for example, or may be formed by directly applying a material in a fluid state, such as a silicon resin which can be easily peeled, on the extension piece 424b.

The extension piece 424b is folded back to a side of one main surface of the sheet body part 424a along the base end portion of the extension piece 424b, thus the peeling part 440 sticks to cover the whole pressure-sensitive adhesive part 430 in the manner peelable from the pressure-sensitive adhesive part 430. Accordingly, reduced is that the pressure-sensitive adhesive part 430 sticks to the other part in storing and transporting the wiring module 420, for example, before the peeling part 440 is peeled. Part of the peeling part 440 protrudes from the pressure-sensitive adhesive part 430 at a tip portion side of the extension piece 424b in a state where the peeling part 440 sticks to the pressure-sensitive adhesive part 430. Accordingly, the peeling part 440 can be easily peeled from the pressure-sensitive adhesive part 430 by pinching the protruding part of the peeling part 440, for example.

In the present embodiment, the pressure-sensitive adhesive part 430 and the peeling part 440 are provided on the surface of the sheet-like member 424 located opposite to the surface to which the electrical wire 26 is fixed, however, the pressure-sensitive adhesive part 430 and the peeling part 440 may be provided on the surface of the sheet-like member 424 where the electrical wire 26 is fixed.

In the present wiring module 420, the peeling part 440 keeps sticking to the pressure-sensitive adhesive part 430 in storing and transporting the wiring module 420.

When the wiring module 420 is fixed to the fixing target member 460, the peeling part 440 is peeled from the pressure-sensitive adhesive part 430, and the extension piece 424b is extended outward from the one side of the sheet body part 424a. Subsequently, the wiring module 420 is disposed along a predetermined electrical wire path on a fixing target surface 461 of the fixing target member 460, and the pressure-sensitive adhesive part 430 is pressed onto the fixing target surface 461. Then, the pressure-sensitive adhesive part 430 sticks to the fixing target surface 461. Accordingly, the wiring module 420 is fixed to the fixing target member 460 in a position along the predetermined electrical wire path. A fixing target member 470 equipped with a wiring module is thereby manufactured.

According to the wiring module 420 having the above configuration, when the wiring module 420 is fixed to the fixing target member 460, the peeling part 440 is peeled from the pressure-sensitive adhesive part 430, and the pressure-sensitive adhesive part 430 is fixed to the fixing target member 460. Thus, the operation of fixing the wiring module 420 to the fixing target member 460 can be easily performed in an area for a fixing operation. At this time, the sheet body part 424a to which the electrical wire 26 is fixed can be fixed to the fixing target member 460 with the pressure-sensitive adhesive part 430 therebetween, thus the electrical wire 26 can be firmly fixed to the predetermined position. The peeling part 440 remains on the extension piece 424b extending from the one side of the sheet body part 424a, thus a generation of garbage can be reduced.

Figure 15:
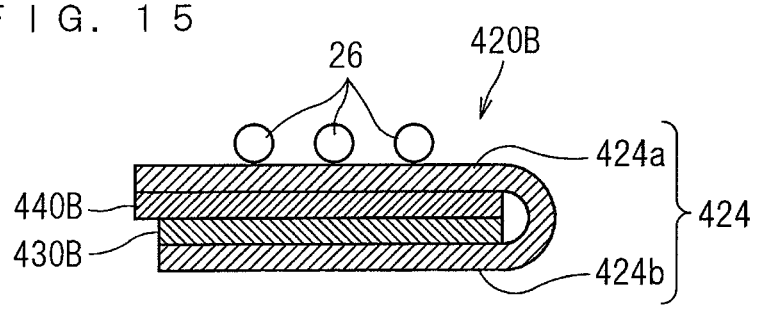
FIG. 15 A schematic cross-sectional view illustrating a wiring module according to a modification example of the second embodiment.
Figure 16:
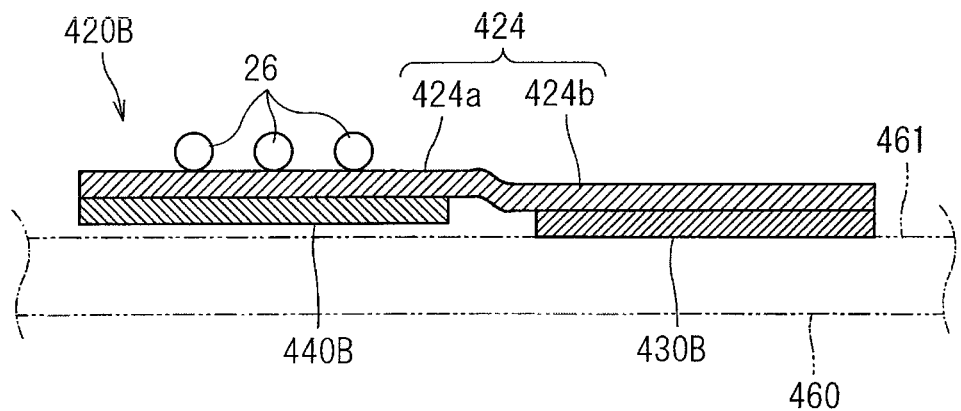
FIG. 16 A schematic cross-sectional view illustrating the wiring module according to the modification example of the second embodiment.

Described in the present second embodiment is the example that the pressure-sensitive adhesive part 430 is provided on the sheet body part 424a in the sheet-like member 424 and the peeling part 440 is provided on the extension piece 424b. However, in contrast, as is the case with the wiring module 420B illustrated in FIG. 15 and FIG. 16, a peeling part 440B corresponding to the peeling part 440 may be provided on the sheet body part 424a and the pressure-sensitive adhesive part 430B corresponding to the pressure-sensitive adhesive part 430 may be provided on the extension piece 424b in the sheet-like member 424.

In this case, the extension piece 424b is fixed to the fixing target member 460 with the pressure-sensitive adhesive part 430 therebetween.

Also in this case, when the wiring module 420B is fixed to the fixing target member 460, the peeling part 440B is peeled from the pressure-sensitive adhesive part 430B, and the pressure-sensitive adhesive part 430B is fixed to the fixing target member 460, thus the operation of fixing the wiring module 420B to the fixing target member 460 can be easily performed in an area for a fixing operation. For example, an operation of applying a gluing agent such as butyl rubber or an adhesive agent such as a hot-melt material using an application device needs not be performed compared with a case of applying such an agent on the fixing target member using the application device, thus the operation of fixing the wiring module can be easily performed. The peeling part 440B remains on the sheet body part 424*a*, thus a generation of garbage can be reduced.

Described in the second embodiment and the modification example described above is the example that the pressure-sensitive adhesive parts 430 and 430B and the peeling parts 440 and 440B are provided on the partial positions in the sheet-like member 424 in the extension direction. However, it is also applicable that the pressure-sensitive adhesive part or the peeling part is provided on the sheet body part in the sheet-like member in the whole extension direction, the extension piece is provided over the whole side part thereof, and the peeling part or the pressure-sensitive adhesive part is provided on the extension piece in the whole extension direction.

Third Embodiment

A wiring module and a fixing target member equipped with a wiring module according to a third embodiment are described.

Figure 17:
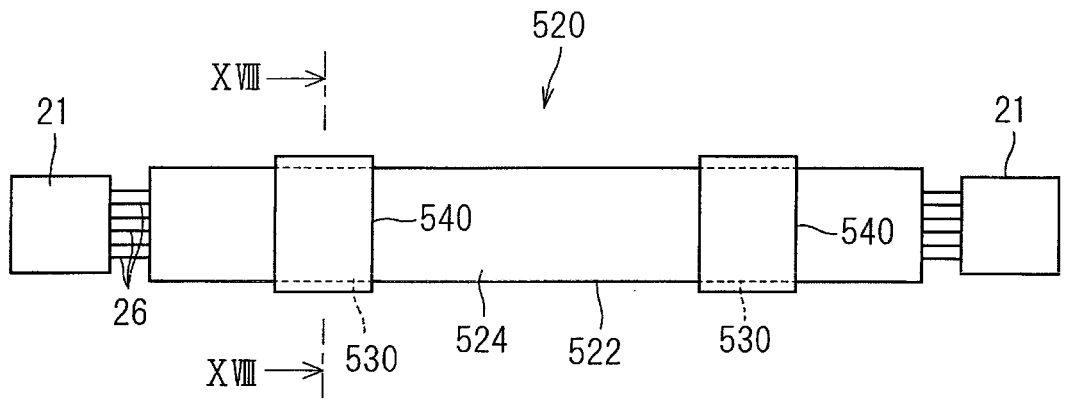
FIG. 17 A schematic bottom view illustrating a wiring module according to a third embodiment.
Figure 18:
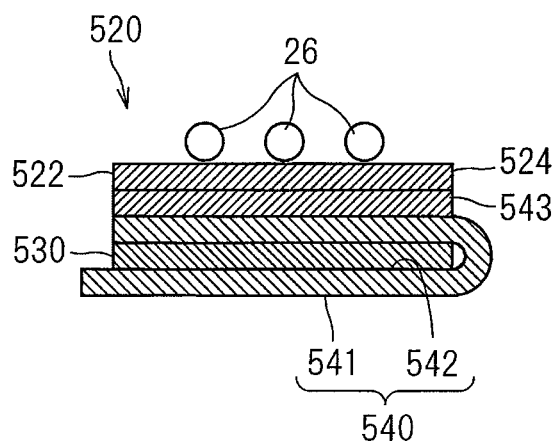
FIG. 18 A schematic cross-sectional view along an XVIII-XVIII line in FIG. 17.
Figure 19:
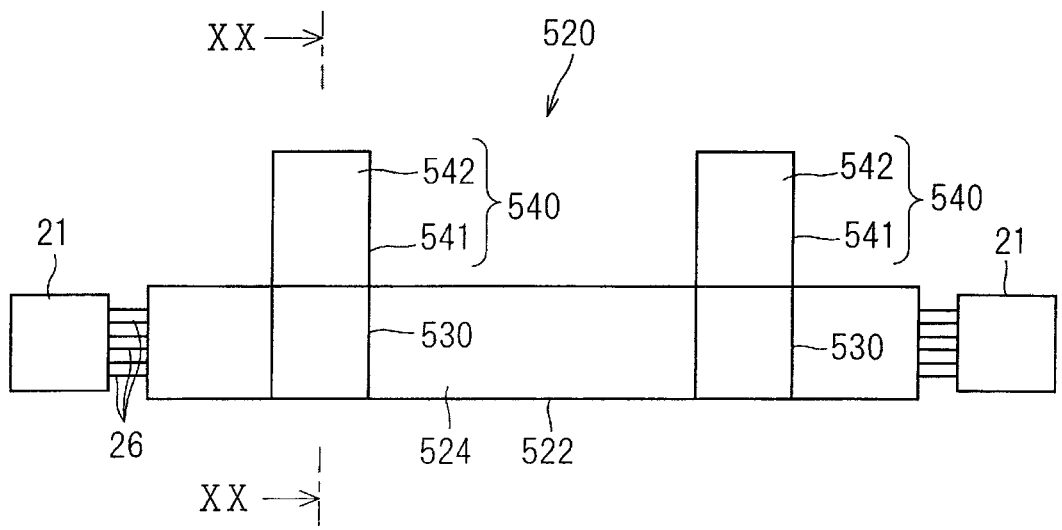
FIG. 19 A schematic bottom view illustrating a state where the wiring module is spread.
Figure 20:
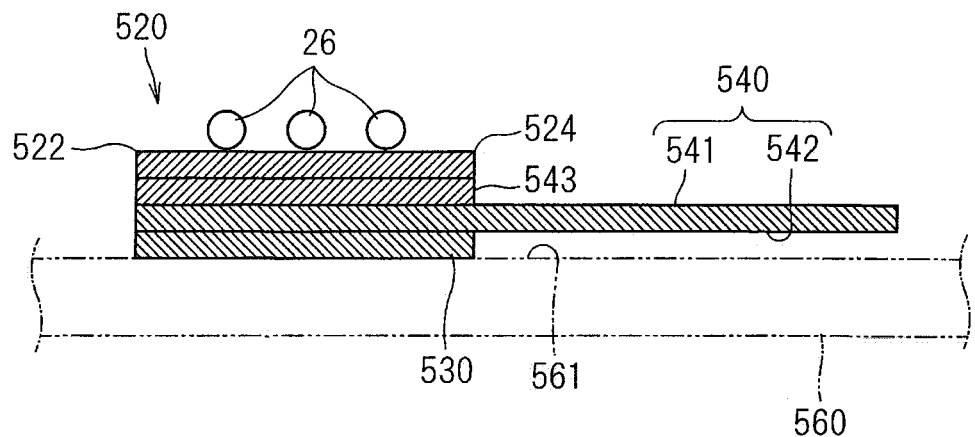
FIG. 20 A schematic cross-sectional view along an XX-XX line in FIG. 19.

FIG. 17 is a schematic bottom view illustrating a wiring module 520, FIG. 18 is a schematic cross-sectional view along an XVIII-XVIII line in FIG. 17, FIG. 19 is a schematic bottom view illustrating a state where the wiring module 520 is spread, and FIG. 20 is a schematic cross-sectional view along an XX-XX line in FIG. 19. In the following description of the present embodiment, the same reference numerals are assigned to the similar constituent elements described in the first or second embodiment, and the description thereof may be omitted in some cases.

The wiring module 520 includes a wiring body 522, an pressure-sensitive adhesive part 530, and a peeling part 540.

The wiring body 522 includes a sheet-like member 524 and at least one electrical wire 26, and is formed into a flat shape as a whole.

The sheet-like member 524 is formed of a sheet material such as polyvinyl chloride (PVC), polypropylene (PP), or a nonwoven fabric. Herein, the sheet-like member 524 is formed into an elongated band-like shape.

The at least one electrical wire 26 (the plurality of electrical wires 26 herein) is fixed to the sheet-like member 524 along an extension direction thereof. The electrical wire 26 can be fixed to the sheet-like member 524 by sewing with a thread, welding such as ultrasonic welding, resistance welding, or laser welding, bonding by an adhesive agent, and pressure-sensitive adhesion by a double-sided tape, for example, as described in the above first embodiment.

The sheet-like member 524 may be bent at a middle part thereof in the extension direction to have an L shape, a V shape, or a U shape, for example. Herein, the plurality of electrical wires 26 are parallelly fixed to the sheet-like member 524, however, at least one of the plurality of electrical wires 26 may be halfway bent and fixed to the sheet-like member 524.

The pressure-sensitive adhesive part 530 is provided on one main surface of the sheet-like member 524 (herein, a surface located opposite to that to which the electrical wire 26 is fixed), and the peeling part 540 is attached to the sheet-like member 524 while extending from one side portion of the sheet-like member 524. The peeling part 540 sticks to the pressure-sensitive adhesive part 530 in the manner easily peeled from the pressure-sensitive adhesive part 530 in a state where a part of the peeling part 540 extending from one side portion of the sheet-like member 524 is bent.

More specifically, the peeling part 540 includes a base material 541 formed into a sheet-like shape and a peeling surface 542 provided on a part of a region in the base material 541.

The base material 541 is formed of paper, cloth, or a resin sheet, for example. Herein, the base material 541 is formed into a band-like shape having a length dimension approximately twice a width dimension of the sheet-like member 524.

A joint part 543 is provided on one main surface of the base material 541. Herein, the joint part 543 is provided on a part, which is an end portion of the base material 541 located on a side of the sheet-like member 524 and a region facing the sheet-like member 524. The joint part 543 is made up of an adhesive agent or a pressure-sensitive adhesive agent, for example, and joins the end portion of the base material 541 located on the side of the sheet-like member 524 to the sheet-like member 524.

The pressure-sensitive adhesive part 530 is provided on the other main surface of the base material 541 in a region of the end portion on the side joined to the sheet-like member 524. The pressure-sensitive adhesive part 530 has a configuration similar to that of the pressure-sensitive adhesive part 30 described above, and is provided in a manner hardly peeled from the other main surface of the base material 541 in the region of the end portion on the side joined to the sheet-like member 524. It is preferable that the region where the pressure-sensitive adhesive part 530 is provided is a part of the sheet-like member 524 in an extension direction and a region of the sheet-like member 524 in a whole width direction in the manner similar to the second embodiment described above, however, this configuration is not necessary.

Processing enabling an easy peeling by a silicon resin, for example, is performed on the end portion of the base material 541 located opposite to the side joined to the sheet-like member 524, that is to say, the other main surface of the base material 541 in the region of the end portion on the side extending to the side of the sheet-like member 524, and the peeling surface 542 is formed. The processing enabling the easy peeling is not performed on a region in the base material 541 other than the region where the peeling surface 542 is formed.

The peeling part 540 is folded back between a part where the pressure-sensitive adhesive part 530 described above is provided and the peeling surface 542 which is a part where the pressure-sensitive adhesive part 530 is not provided, and the peeling surface 542 sticks to the pressure-sensitive adhesive part 530 in the manner easily peeled from the pressure-sensitive adhesive part 530. When a part of the peeling part 540 protruding from the sheet-like member 524 and folded back is pulled in a direction of being peeled from the pressure-sensitive adhesive part 530 in a state where the peeling part 540 is joined to the sheet-like member 524 with the joint part 543 therebetween and the peeling surface 542 sticks to the pressure-sensitive adhesive part 530, the adhesion between the pressure-sensitive adhesive part 530 and the peeling surface 542 is released. It is preferable that the peeling surface 542 is larger than the pressure-sensitive adhesive part 530, and accordingly, at least part of the peeling surface 542 protrudes from the pressure-sensitive adhesive part 530 in the state where the peeling surface 542 sticks to the pressure-sensitive adhesive part 530. Herein, the end portion of the peeling part 540 protrudes from the pressure-sensitive adhesive part 530.

In the state where the part of the peeling part 540 extending to the outside of the sheet-like member 524 is folded back and the peeling surface 542 sticks to the pressure-sensitive adhesive part 530, the peeling part 540 covers the pressure-sensitive adhesive part 530, thus reduced is that the pressure-sensitive adhesive part 530 sticks to the other part in storage and transportation, for example, before the peeling part 540 is peeled.

In the present embodiment, the pressure-sensitive adhesive part 530 and the peeling part 540 are provided on the surface of the sheet-like member 524 located opposite to the surface to which the electrical wire 26 is fixed, however, the pressure-sensitive adhesive part 530 and the peeling part 540 may be provided on the surface of the sheet-like member 524 where the electrical wire 26 is fixed.

In the present wiring module 520, the peeling part 540 keeps sticking to the pressure-sensitive adhesive part 530 in housing and transporting the wiring module 520.

Figure 21:
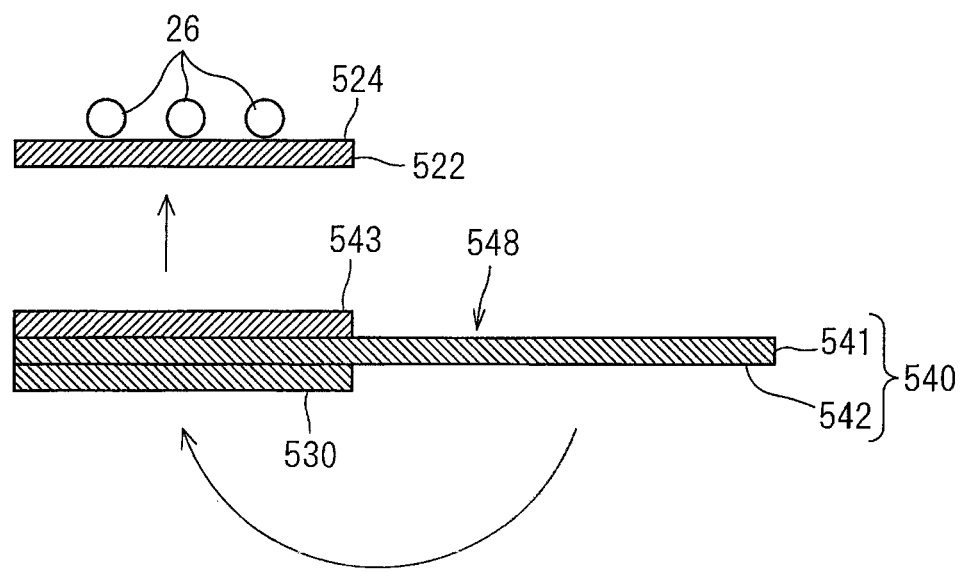
FIG. 21 An explanation diagram illustrating an example of manufacturing the wiring module.

The wiring module 520 described above can be easily manufactured by preparing a peeling part 548 with an pressure-sensitive adhesive part provided with the pressure-sensitive adhesive part 530 on one main surface of one end portion of the base material 541 and the joint part 543, which can stick, on the other main surface and making the joint part 543 stick to the wiring body 522 as illustrated in FIG. 21, for example. The peeling surface 542 of the peeling part 540 may stick to the pressure-sensitive adhesive part 530 in advance before the joint part 543 sticks to the wiring body 522, or may stick to the pressure-sensitive adhesive part 530 after the joint part 543 sticks to the wiring body 522.

When the wiring module 520 is fixed to the fixing target member 560, the peeling part 540 is peeled from the pressure-sensitive adhesive part 530, and the part of the peeling part 540 extends to one outside of the sheet-like member 524. Subsequently, the wiring module 520 is disposed along a predetermined electrical wire path on the fixing target surface 561 of the fixing target member 560, and the pressure-sensitive adhesive part 530 is pressed onto the fixing target surface 561. Then, the pressure-sensitive adhesive part 530 sticks to the fixing target surface 561. Accordingly, the wiring module 520 is fixed to the fixing target member 560 in a position along the predetermined electrical wire path. A fixing target member 570 equipped with a wiring module is thereby manufactured.

According to the wiring module 520 having the above configuration, when the wiring module 520 is fixed to the fixing target member 560, the peeling part 540 is peeled from the pressure-sensitive adhesive part 530, and the pressure-sensitive adhesive part 530 is fixed to the fixing target member 560. Thus, the operation of fixing the wiring module 520 to the fixing target member 560 can be easily performed in an area for a fixing operation. At this time, the sheet-like member 524 to which the electrical wire 26 is fixed can be fixed to the fixing target member 560 with the pressure-sensitive adhesive part 530 therebetween, thus the electrical wire 26 can be firmly fixed to the predetermined position. The peeling part 540 extends to one outside of the sheet-like member 524 and remains, thus a generation of garbage can be reduced.

Figure 22:
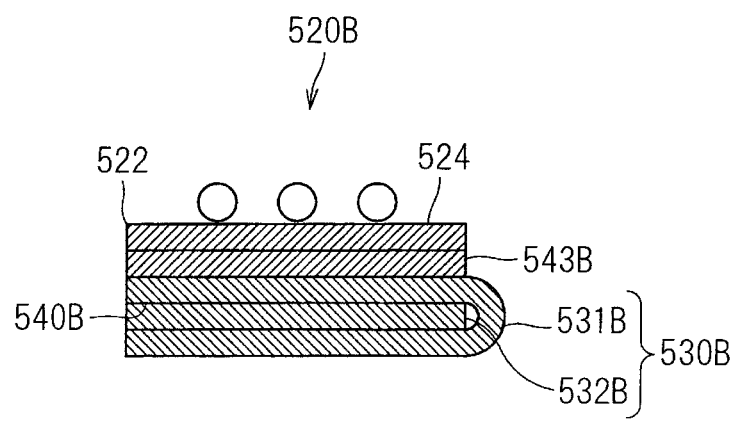
FIG. 22 A schematic cross-sectional view illustrating a wiring module according to a modification example of the third embodiment.
Figure 23:
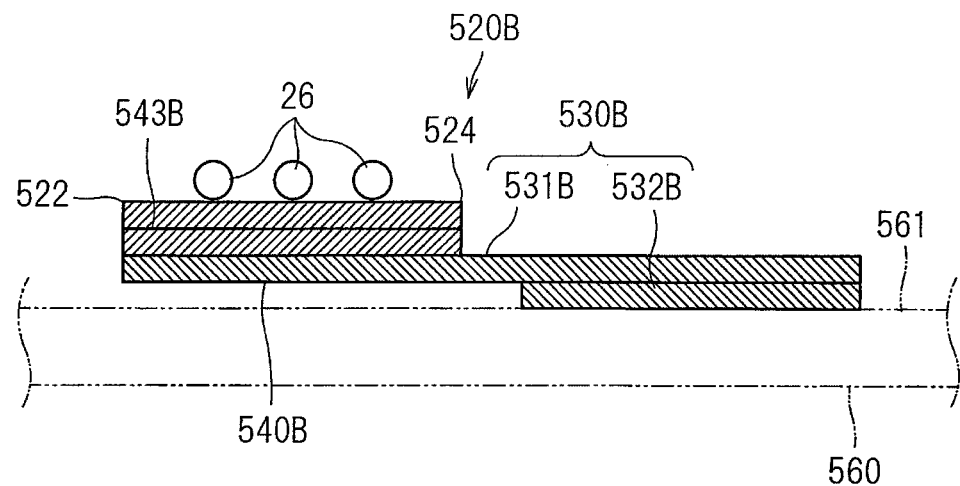
FIG. 23 A schematic cross-sectional view illustrating the wiring module according to the modification example of the third embodiment.

Described in the present third embodiment is the example that the pressure-sensitive adhesive part 530 is provided on the sheet-like member 524 and the peeling part 540 is provided on the sheet-like member 524 in a manner extending to the outside of the sheet-like member 524. However, in contrast, as is the case with the wiring module 520B illustrated in FIG. 22 and FIG. 23, a peeling part 540B is provided on the sheet-like member 524 and an pressure-sensitive adhesive part 530B may be provided on the sheet-like member 524 in a manner extending to the outside of the sheet-like member 524.

More specifically, the pressure-sensitive adhesive part 530B includes a base material 531B and an pressure-sensitive adhesive layer 532B provided on a part of a region in the base material 531B.

The base material 531B is formed of paper, cloth, or a resin sheet, for example. Herein, the base material 531B is formed into a band-like shape having a length dimension approximately twice a width dimension of the sheet-like member 524.

A joint part 543B similar to the joint part 543 described above is provided on one main surface of the base material 531B.

The peeling part 540B is provided on the other main surface of the base material 531B in a region of the end portion on the side joined to the sheet-like member 524 by processing similar to that performed on the peeling surface 542 described above.

The pressure-sensitive adhesive layer 532B similar to the pressure-sensitive adhesive part 530 described above is provided on the end portion of the base material 531B located opposite to the side joined to the sheet-like member 524, that is to say, the other main surface of the base material 531B in the region of the end portion on the side extending to the outside of the sheet-like member 524.

Then, the part of the peeling part 540B extending from the sheet-like member 524 is folded back, that is to say, the peeling part 540B is folded back between a part where the pressure-sensitive adhesive part 530B described above is provided and the peeling part 540B which is a part where the pressure-sensitive adhesive part 532B is not provided, and the peeling part 540B sticks to the pressure-sensitive adhesive part 532B in the manner easily peeled from the pressure-sensitive adhesive part 532B. When a part of the pressure-sensitive adhesive part 530B protruding from the sheet-like member 524 and folded back is pulled in a direction of being peeled from the peeling part 540B in a state where the pressure-sensitive adhesive part 532B is joined to the sheet-like member 524 with the joint part 543B therebetween and the peeling part 540B sticks to the pressure-sensitive adhesive part 532B, the adhesion between the pressure-sensitive adhesive part 532B and the peeling surface 540B is released.

In this case, the wiring module 520B is fixed to the fixing target member 560 via the pressure-sensitive adhesive layer 532B of the pressure-sensitive adhesive part 530B extending to the outside of the sheet-like member 524 therebetween.

Figure 24:
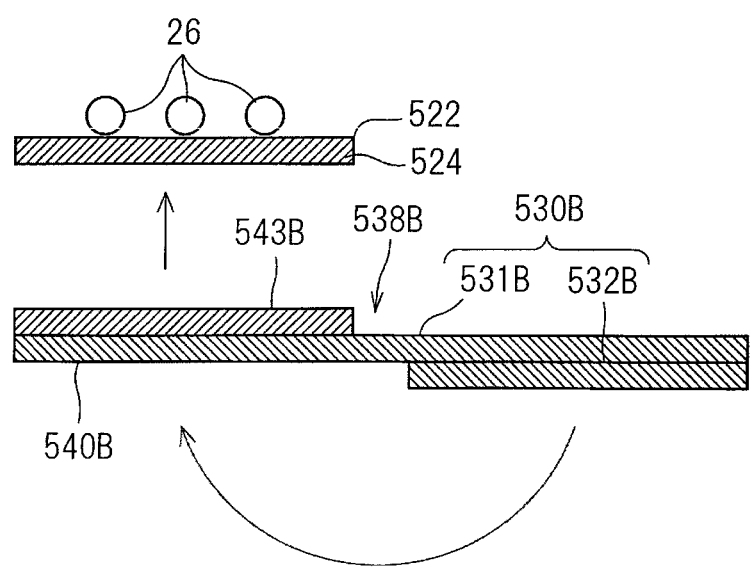
FIG. 24 An explanation diagram illustrating an example of manufacturing the wiring module according to the modification example of the third embodiment.

The wiring module 520B described above can be easily manufactured by preparing an pressure-sensitive adhesive part 538B with a peeling part provided with the pressure-sensitive adhesive part 532B on one main surface of one end portion of the base material 531B and the joint part 543B, which can stick, on the other main surface of the other end portion and making the joint part 543B stick to the wiring body 522 as illustrated in FIG. 24, for example. In the manner similar to the configuration described above, the peeling part 540B and the pressure-sensitive adhesive layer 532B can be made to stick to each other at any time before or after the joint part 543B sticks to the wiring body 522.

Also in this case, when the wiring module 520B is fixed to the fixing target member 560, the peeling part 540B is peeled from the pressure-sensitive adhesive part 530B, and the pressure-sensitive adhesive part 532B is fixed to the fixing target member 560, thus the operation of fixing the wiring module 520B to the fixing target member 560 can be easily performed in an area for a fixing operation. The peeling part 540B remains on the sheet-like member 524, thus a generation of garbage can be reduced.

Described in the third embodiment and the modification example described above is the example that the pressure-sensitive adhesive part 530 or the pressure-sensitive adhesive layer 532B and the peeling part 440 or the peeling surface 542 are provided in the partial positions in the sheet-like member 524 in the extension direction, however, it is also applicable that the pressure-sensitive adhesive part or the peeling part is provided on the sheet body part of the sheet-like member in the whole extension direction and the peeling part or the pressure-sensitive adhesive part extends over the whole side part thereof.

The configuration of not extending the peeling part or the pressure-sensitive adhesive part to the outside of the wiring body can also be applied to the configuration of providing the peeling part 548 with the pressure-sensitive adhesive part or the pressure-sensitive adhesive part 538B with the peeling part. For example, the peeling part 548 with the pressure-sensitive adhesive part or the pressure-sensitive adhesive part 538B with the peeling part having the configuration not protruding around the wiring body may be joined to the wiring body having a flat shape with the joint part therebetween. The peeling part 548 with the pressure-sensitive adhesive part or the pressure-sensitive adhesive part 538B with the peeling part is also applicable to a wiring body not having a flat shape, for example, a wiring body made up of a plurality of bound electrical wires.

Fourth Embodiment

A composite wiring module 600 according to a fourth embodiment is described.

Figure 25:
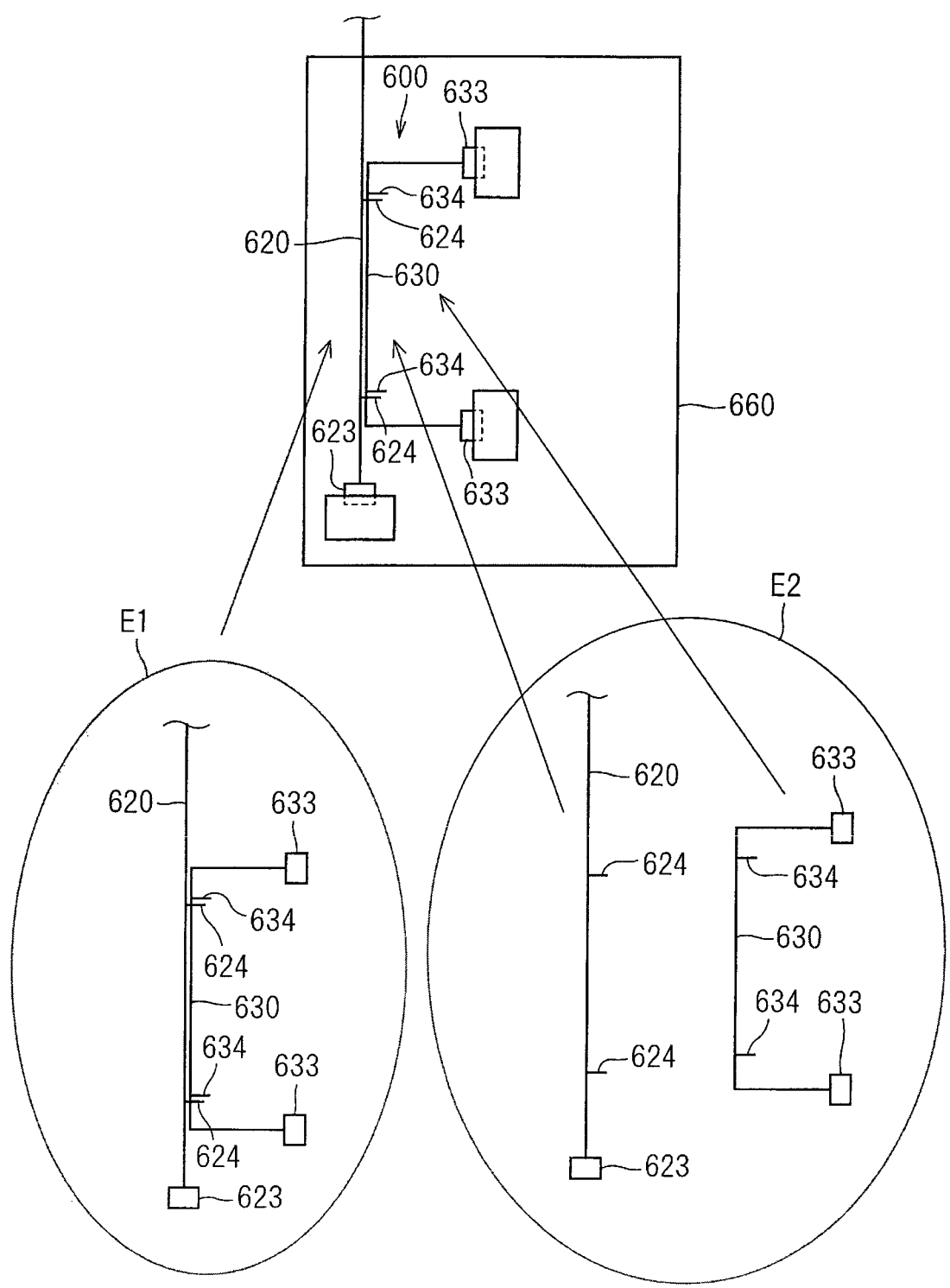
FIG. 25 An explanation diagram illustrating a composite wiring module according to a fourth embodiment.

FIG. 25 is an explanation diagram illustrating the composite wiring module 600. The composite wiring module 600 includes a base wiring module 620 and an additional wiring module 630.

The base wiring module 620 includes wirings used in common regardless of a type of a vehicle on which the wiring module is mainly mounted and a presence or absence of an optional electrical component, for example. The additional wiring module 630 includes wirings additionally mounted in accordance with a type of a vehicle on which the wiring module is mounted and an optional electrical component. The base wiring module 620 and the additional wiring module 630 can be separately incorporated, thus only the base wiring module 620 can be incorporated or the base wiring module 620 and the additional wiring module 630 can be incorporated in combination in accordance with the type of the vehicle and the optional electrical component. A plural types of wiring modules are prepared as the additional wiring module 630, thus a type of the base wiring module 620 corresponding to the type of the vehicle and the optional electrical component can be additionally incorporated into the base wiring module 620. Accordingly, the appropriate wiring module can be incorporated into the vehicle in accordance with the type of the vehicle on which the wiring module is mounted and the optional electrical component.

In the composite wiring module 600, used as the base wiring module 620 is any one of the wiring modules 420 and 420B described in the second embodiment and the wiring modules 520 and 520B described in the third embodiment. Used as the additional wiring module 630 is any one of the wiring modules 420 and 420B described in the second embodiment and the wiring modules 520 and 520B described in the third embodiment.

The wiring modules 420 and 420B described in the second embodiment include the extension piece 424b as a part protruding to the outside of the wiring body. The wiring modules 520 and 520B described in the third embodiment include the peeling part 540 or the pressure-sensitive adhesive part 530B as a part protruding to the outside of the wiring body. Thus, both the base wiring module 620 and the additional wiring module 630 include the part protruding to the outside of the wiring body. FIG. 25 illustrates a protruding portion 624, in the base wiring module 620, protruding to the outside of the wiring body and a protruding portion 634, in the additional wiring module 630, protruding to the outside of the wiring body. In FIG. 25, the band-like sheet portion to which at least one electrical wire is fixed is illustrated as one line in a simplified manner.

When the additional wiring module 630 is added to the base wiring module 620, at least a part of the additional wiring module 630 is disposed along the base wiring module 620 in a state where the protruding portion 634 of the additional wiring module 630 is made to correspond to the protruding portion 624 of the base wiring module 620. Thus, the base wiring module 620 and the additional wiring module 630 are combined while being positioned.

The following two aspects are assumed as the aspect of adding the additional wiring module 630 to the base wiring module 620. A first aspect is an aspect of attaching the additional wiring module 630 to the base wiring module 620 to manufacture the composite wiring module 600, and subsequently fixing the composite wiring module 600 to the fixing target member 660 such as a roof lining as illustrated in a circled area E1 in a left lower side of FIG. 25. A second aspect is an aspect of bringing the base wiring module 620 and the additional wiring module 630, which are separated from each other, close to the fixing target member 660, fixing the base wiring module 620 to the fixing target member 660, and subsequently fixing the additional wiring module 630 to the base wiring module 620 or the fixing target member 660 to manufacture the composite wiring module 600 as illustrated in a circled area E2 in a right lower side of FIG. 25.

In any of the aspects, a connector 623 on an end portion of the base wiring module 620 and a connector 633 on an end portion of the additional wiring module 630 are connector-connected to an electrical component fixed to the fixing target member 660, for example. Considered is a case where at least one of the base wiring module 620 and the additional wiring module 630 is bent. When the base wiring module 620 and the additional wiring module 630 are bent, assumed are a configuration of forming the sheet-like member itself into a bent shape and a configuration of bending back the sheet-like member, which has been formed into a linear shape, at a desired angle.

The first aspect described above is described more specifically. In the following description, common parts between the wiring modules 420 and 420B described in the second embodiment and the wiring modules 520 and 520B described in the third embodiment are extracted and described as the base wiring module 620 and the additional wiring module 630. That is to say, the base wiring module 620 includes at least one electrical wire 621, a band-like sheet portion 622 to which the at least one electrical wire 621 is fixed, and a protruding portion 624 protruding to one outside of the band-like sheet portion 622. An pressure-sensitive adhesive part 625 is provided on one of a main surface of a part of the band-like sheet portion 622 corresponding to a position where the protruding portion 624 is formed and a main surface of the protruding portion 624, and a peeling part 626 is provided on the other one of the main surfaces. The additional wiring module 630 includes at least one electrical wire 631, a band-like sheet portion 632 to which the at least one electrical wire 631 is fixed, and a protruding portion 634 protruding to one outside of the band-like sheet portion 632. An pressure-sensitive adhesive part 635 is provided on one of a main surface of a part of the band-like sheet portion 632 corresponding to a position where the protruding portion 634 is formed and a main surface of the protruding portion 634, and a peeling part 636 is provided on the other one of the main surfaces.

Figure 26:
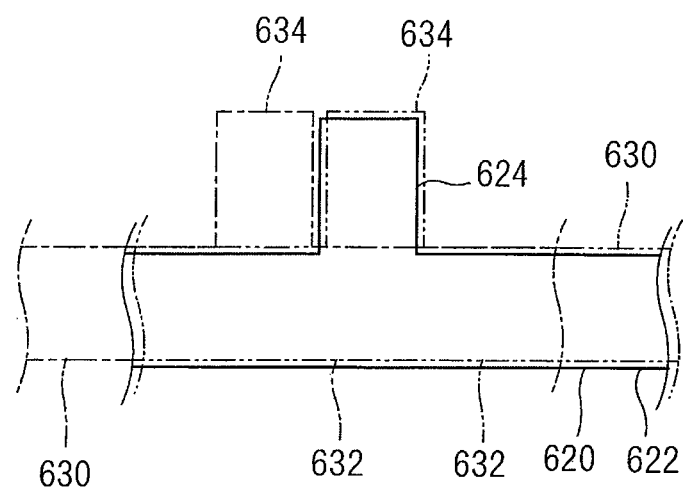
FIG. 26 A schematic plan view illustrating an example of combining a base wiring module and an additional wiring module in a state of overlapping band-like sheet portions.

Assumed in this case is that, as illustrated in FIG. 26, the band-like sheet portion 622 of the base wiring module 620 and the band-like sheet portion 622 of the additional wiring module 630 are overlapped with each other. Assumed in this case as a configuration of making the protruding portion 624 and the protruding portion 634 corresponding to each other is that the protruding portion 624 and the protruding portion 634 are overlapped with each other (refer to the additional wiring module 630 indicated by an alternate long and two short dashes line) or the protruding portion 624 and the protruding portion 634 are adjacent to each other (refer to the additional wiring module 630 indicated by an alternate long and short dash line). When the protruding portion 624 and the protruding portion 634 are adjacent to each other, the protruding portions 624 and 634 may be in contact with each other or an interval may be provided between the protruding portions 624 and 634.

Figure 27:
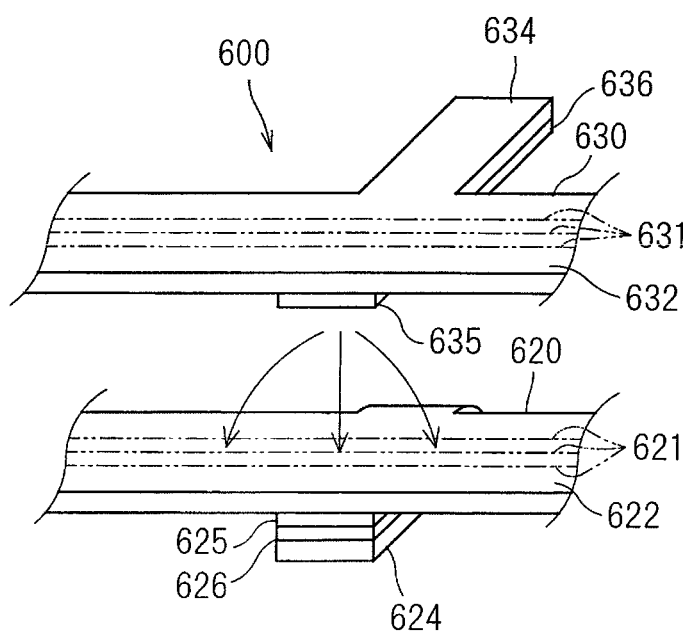
FIG. 27 A schematic perspective view illustrating an example of combining the base wiring module and the additional wiring module in the above state.

More specifically, as illustrated in FIG. 27, in the base wiring module 620, the protruding portion 624 is bent, and the peeling part 626 sticks to the pressure-sensitive adhesive part 625. In the base wiring module 620, the pressure-sensitive adhesive part 625 and the peeling part 626 may be provided on any of the band-like sheet portion 622 and the protruding portion 624. Prepared is the additional wiring module 630 in which the pressure-sensitive adhesive part 635 is provided on the band-like sheet portion 632 and the peeling part 636 is provided on the protruding portion 634. Then, the peeling part 636 is peeled from the pressure-sensitive adhesive part 635 to extend the protruding portion 634 to the outside of the band-like sheet portion 632, and the pressure-sensitive adhesive part 635 sticks to the band-like sheet portion 622 of the base wiring module 620 from an upper side of the electrical wire 621. At this time, the protruding portion 634 of the additional wiring module 630 can be disposed in the same position as the protruding portion 624 or the position adjacent to the protruding portion 624 while confirming the position of the protruding portion 624 of the base wiring module 620. Thus, the additional wiring module 630 can be fixed while being positioned in a predetermined position with respect to the base wiring module 620. The composite wiring module 600 is thereby manufactured.

When the composite wiring module 600 is fixed to the fixing target member, the peeling part 626 is peeled from the pressure-sensitive adhesive part 625 to extend the protruding portion 624 to the outside of the band-like sheet portion 622, and the pressure-sensitive adhesive part 625 sticks to the fixing target member. Thus, the base wiring module 620 and the additional wiring module 630 can be collectively fixed to the fixing target member.

Figure 28:
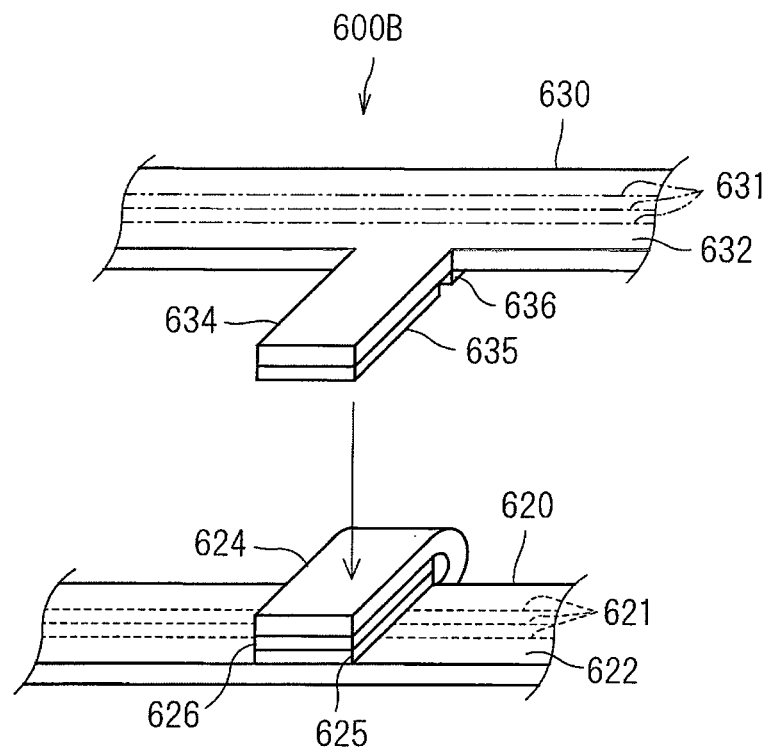
FIG. 28 A schematic perspective view illustrating an example of combining the base wiring module and the additional wiring module in the above state.

Alternatively, as illustrated in FIG. 28, in the base wiring module 620, the protruding portion 624 is bent, and the peeling part 626 sticks to the pressure-sensitive adhesive part 625. In the base wiring module 620, the pressure-sensitive adhesive part 625 and the peeling part 626 may be provided on any of the band-like sheet portion 622 and the protruding portion 624. Prepared is the additional wiring module 630 in which the peeling part 636 is provided on the band-like sheet portion 632 and the pressure-sensitive adhesive part 635 is provided on the protruding portion 634. Then, the peeling part 636 is peeled from the pressure-sensitive adhesive part 635 to extend the protruding portion 634 to the outside of the band-like sheet portion 632, and the pressure-sensitive adhesive part 635 of the protruding portion 634 sticks to an outward surface of the protruding portion 634. At this time, the protruding portion 634 of the additional wiring module 630 can be overlapped on the protruding portion 624 while confirming the position of the protruding portion 624 of the base wiring module 620. Thus, the additional wiring module 630 can be fixed while being positioned in a predetermined position with respect to the base wiring module 620. A composite wiring module 600B is thereby manufactured.

Thus, also in the composite wiring module 600B, the base wiring module 620 and the additional wiring module 630 can be collectively fixed to the fixing target member in the manner similar to the above description.

Figure 29:
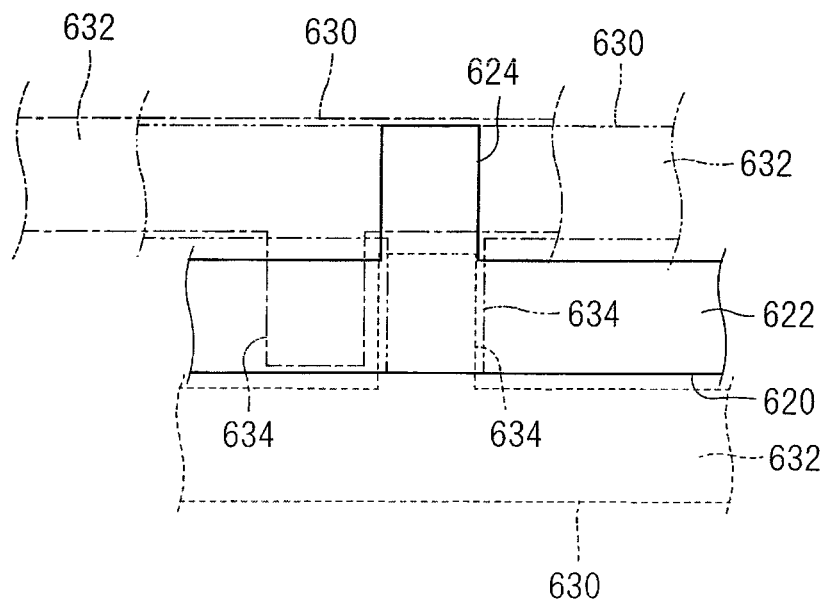
FIG. 29 A schematic plan view illustrating an example of combining the base wiring module and the additional wiring module in a state of making the band-like sheet portions adjacent to each other.

Assumed is that, as illustrated in FIG. 29, the band-like sheet portion 622 of the base wiring module 620 and the band-like sheet portion 622 of the additional wiring module 630 are adjacent to each other. Assumed in this case as a configuration of making the protruding portion 624 and the protruding portion 634 corresponding to each other is that the protruding portion 634 of the additional wiring module 630 is overlapped with a position in the band-like sheet portion 622 of the base wiring module 620 corresponding to the protruding portion 624 (refer to the additional wiring module 630 indicated by an alternate long and two short dashes line) or the protruding portion 634 of the additional wiring module 630 is overlapped with a position adjacent to a position in the band-like sheet portion 622 of the base wiring module 620 corresponding to the protruding portion 624 (refer to the additional wiring module 630 indicated by an alternate long and short dash line). In any case, the band-like sheet portion 632 of the additional wiring module 630 may be adjacent to the band-like sheet portion 622 of the base wiring module 620 at a side where the protruding portion 624 is located or an opposite side thereof (refer to the additional wiring module 630 indicated by a dotted line).

Figure 30:
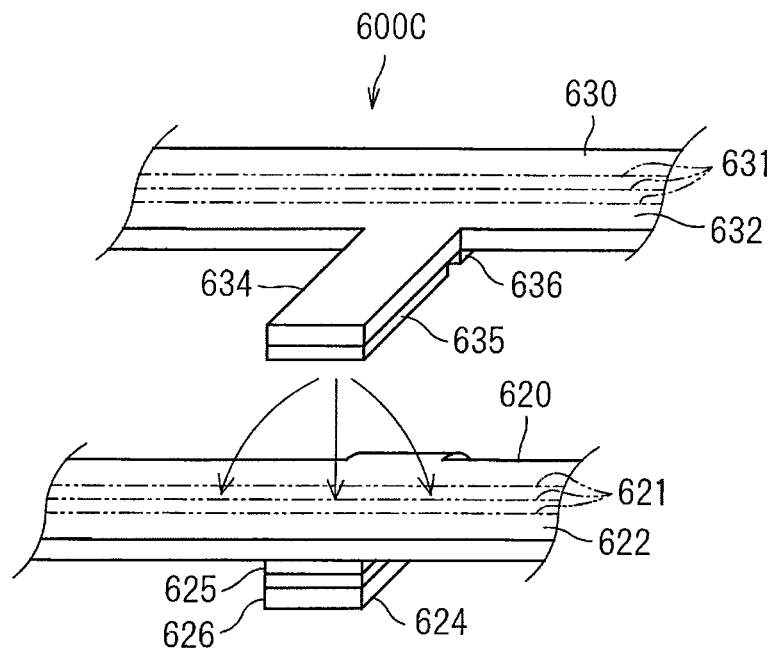
FIG. 30 A schematic perspective view illustrating an example of combining the base wiring module and the additional wiring module in the above state.

More specifically, as illustrated in FIG. 30, in the base wiring module 620, the protruding portion 624 is bent, and the peeling part 626 sticks to the pressure-sensitive adhesive part 625. In the base wiring module 620, the pressure-sensitive adhesive part 625 and the peeling part 626 may be provided on any of the band-like sheet portion 622 and the protruding portion 624. Prepared is the additional wiring module 630 in which the peeling part 636 is provided on the band-like sheet portion 632 and the pressure-sensitive adhesive part 635 is provided on the protruding portion 634. Then, the peeling part 636 is peeled from the pressure-sensitive adhesive part 635 to extend the protruding portion 634 to the outside of the band-like sheet portion 632, and the pressure-sensitive adhesive part 635 of the protruding portion 634 sticks to a part of the band-like sheet portion 622 corresponding to the protruding portion 624 or a part adjacent thereto from an upper side of the electrical wire 621. The band-like sheet portion 632 is positioned on a side of the band-like sheet portion 622 where the protruding portion 624 is provided. At this time, the protruding portion 634 of the additional wiring module 630 can be overlapped on the band-like sheet portion 622 while confirming the position of the protruding portion 624 of the base wiring module 620. Thus, the additional wiring module 630 can be fixed while being positioned in a predetermined position with respect to the base wiring module 620. A composite wiring module 600C is thereby manufactured.

Thus, also in the composite wiring module 600C, the base wiring module 620 and the additional wiring module 630 can be collectively fixed to the fixing target member in the manner similar to the above description.

Figure 31:
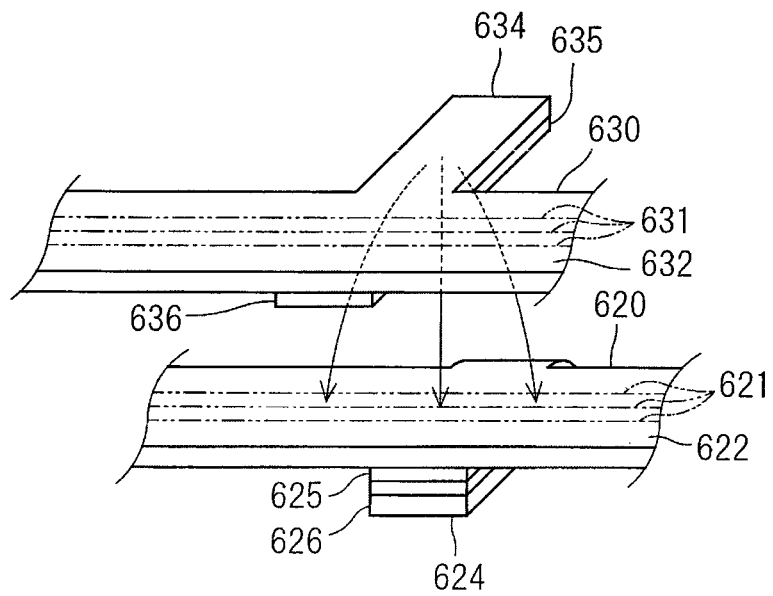
FIG. 31 A schematic perspective view illustrating an example of combining the base wiring module and the additional wiring module in the above state.

Alternatively, it is also applicable as illustrated in FIG. 31 that the pressure-sensitive adhesive part 635 of the protruding portion 634 sticks to a part of the band-like sheet portion 622 corresponding to the protruding portion 624 or a part adjacent thereto from an upper side of the electrical wire 621 in a state where the composite wiring module 600 is fixed to the fixing target member 600 and the band-like sheet member 632 is positioned on a side of the band-like sheet portion 622 opposite to a side thereof where the protruding portion 624 is provided. A composite wiring module 600D is thereby manufactured.

Figure 32:
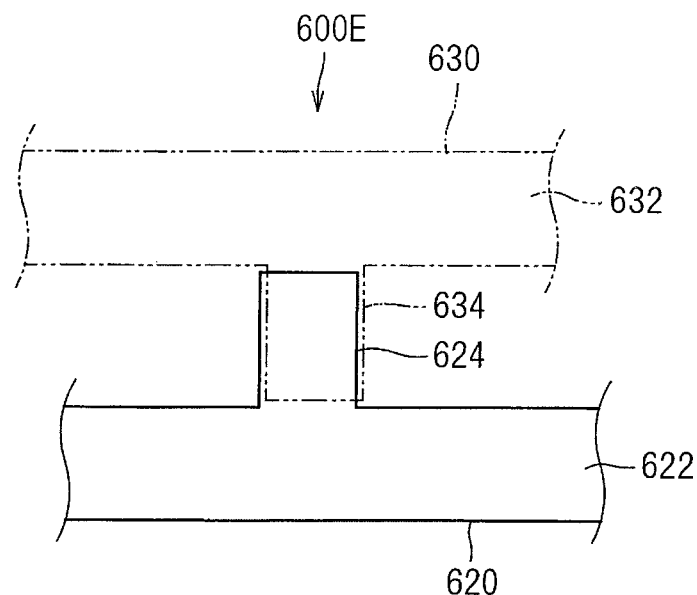
FIG. 32 A schematic plan view illustrating an example of combining the base wiring module and the additional wiring module in a state of arranging the band-like sheet portions in parallel with an interval therebetween.

Also assumed is that, as illustrated in FIG. 32, upon observing the composite wiring module 600E in a state of being fixed to the fixing target member, the band-like sheet portion 622 of the base wiring module 620 and the band-like sheet portion 622 of the additional wiring module 630 are disposed with an interval therebetween.

Figure 33:
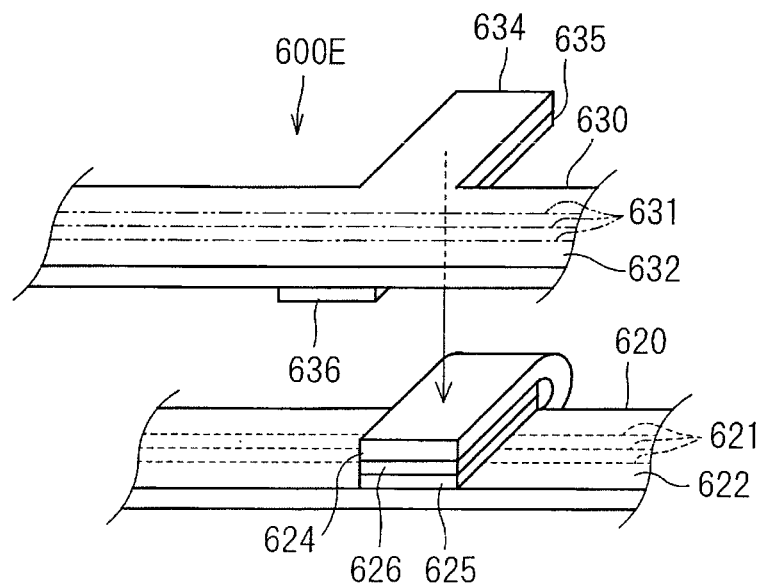
FIG. 33 A schematic perspective view illustrating an example of combining the base wiring module and the additional wiring module in the above state.

In this case, as illustrated in FIG. 33, in the base wiring module 620, the protruding portion 624 is bent, and the peeling part 626 sticks to the pressure-sensitive adhesive part 625. In the base wiring module 620, the pressure-sensitive adhesive part 625 and the peeling part 626 may be provided on any of the band-like sheet portion 622 and the protruding portion 624. Prepared is the additional wiring module 630 in which the peeling part 636 is provided on the band-like sheet portion 632 and the pressure-sensitive adhesive part 635 is provided on the protruding portion 634. Then, the peeling part 636 is peeled from the pressure-sensitive adhesive part 635 to extend the protruding portion 634 to the outside of the band-like sheet portion 632, and the pressure-sensitive adhesive part 635 of the protruding portion 634 sticks to an outward surface of the protruding portion 624. At this time, the protruding portion 634 of the additional wiring module 630 can be overlapped on the band-like sheet portion 622 while confirming the position of the protruding portion 624 of the base wiring module 620. Thus, the additional wiring module 630 can be fixed while being positioned in a predetermined position with respect to the base wiring module 620. A composite wiring module 600E is thereby manufactured.

Also in the composite wiring module 600E, the base wiring module 620 and the additional wiring module 630 can be collectively fixed to the fixing target member in the manner similar to the above description.

Described is the second aspect, that is to say, an aspect of fixing the base wiring module 620 to the fixing target member 660, and subsequently fixing the additional wiring module 630 to the base wiring module 620 or the fixing target member 660 to manufacture the composite wiring module.

In the second aspect, the aspect of fixing the additional wiring module 630 to the base wiring module 620 can be similar to that described in the first aspect described above to manufacture the composite wiring module.

Figure 34:
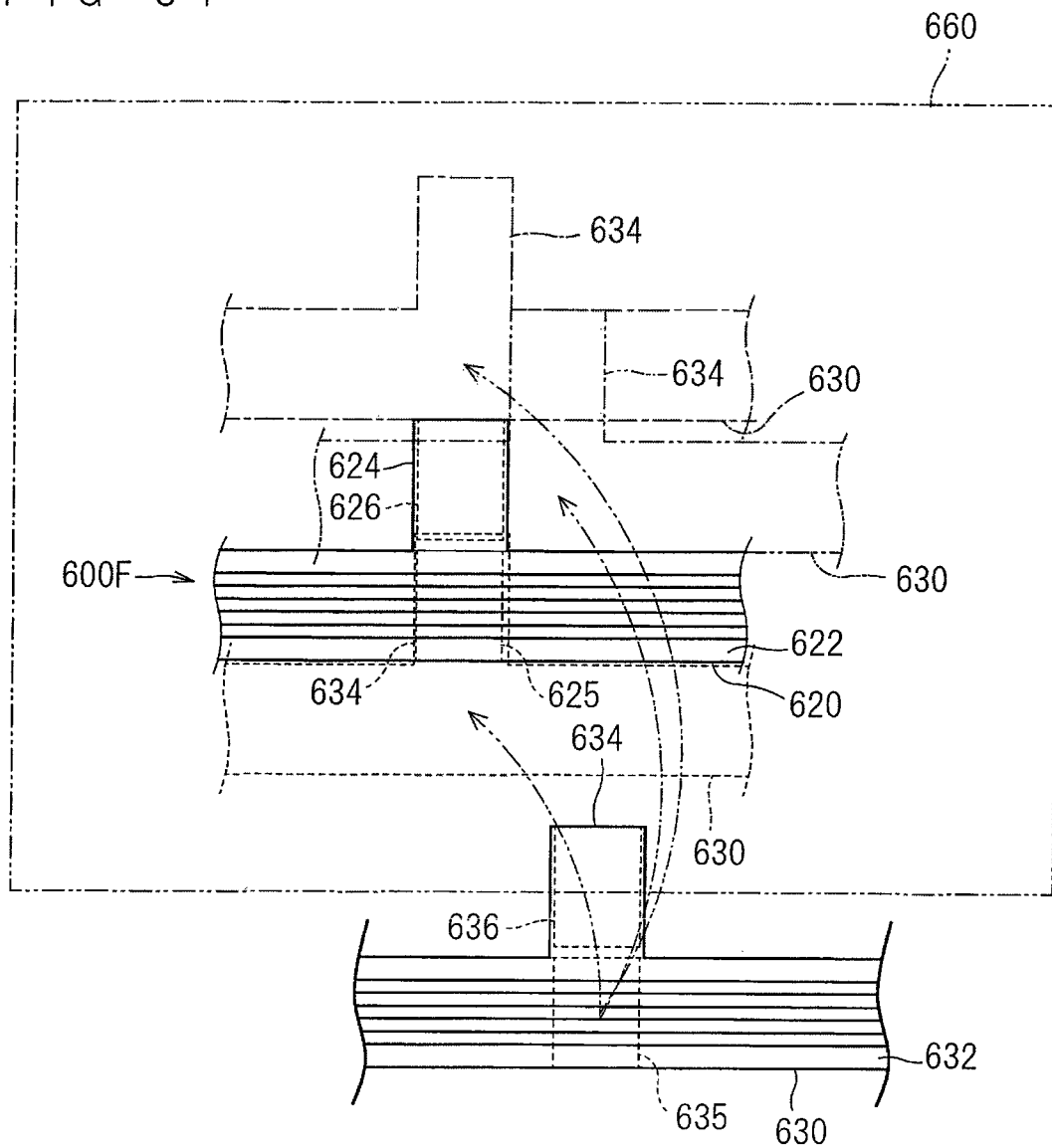
FIG. 34 An explanation diagram illustrating an example of a composite wiring module in which a base wiring module and an additional wiring module are fixed to a fixing target member.

The aspect of fixing the base wiring module 620 to the fixing target member 660 and subsequently fixing the additional wiring module 630 to the fixing target member 660 can be performed as illustrated in FIG. 34. Herein, the pressure-sensitive adhesive part 635 is provided on the band-like sheet portion 632. The pressure-sensitive adhesive part 635 may be provided on the protruding portion 634.

The base wiring module 620 is fixed to the fixing target member 660. In the base wiring module 620, the pressure-sensitive adhesive part 625 may be provided on any of the band-like sheet portion 622 and the protruding portion 624.

In the additional wiring module 630, the pressure-sensitive adhesive part 635 is provided on the band-like sheet portion 632. The pressure-sensitive adhesive part 635 sticks to the fixing target member 660 while the protruding portion 634 is positioned in a diagonal outward position (refer to the additional wiring module 630 indicated by an alternate long and two short dashes line), an outward position (refer to the additional wiring module 630 indicated by an alternate long and short dash line), and a base end position (refer to the additional wiring module 630 indicated by a dotted line) with respect to the protruding portion 624 in a state where the protruding portion 624 of the base wiring module 620 and the protruding portion 624 of the additional wiring module 630 are arranged in the same direction, thus the additional wiring module 630 can be fixed to the fixing target member 660. The base wiring module 620 and the additional wiring module 630 are thereby integrated with each other with the fixing target member 660 therebetween, and are manufactured as a composite wiring module 600F.

Figure 35:
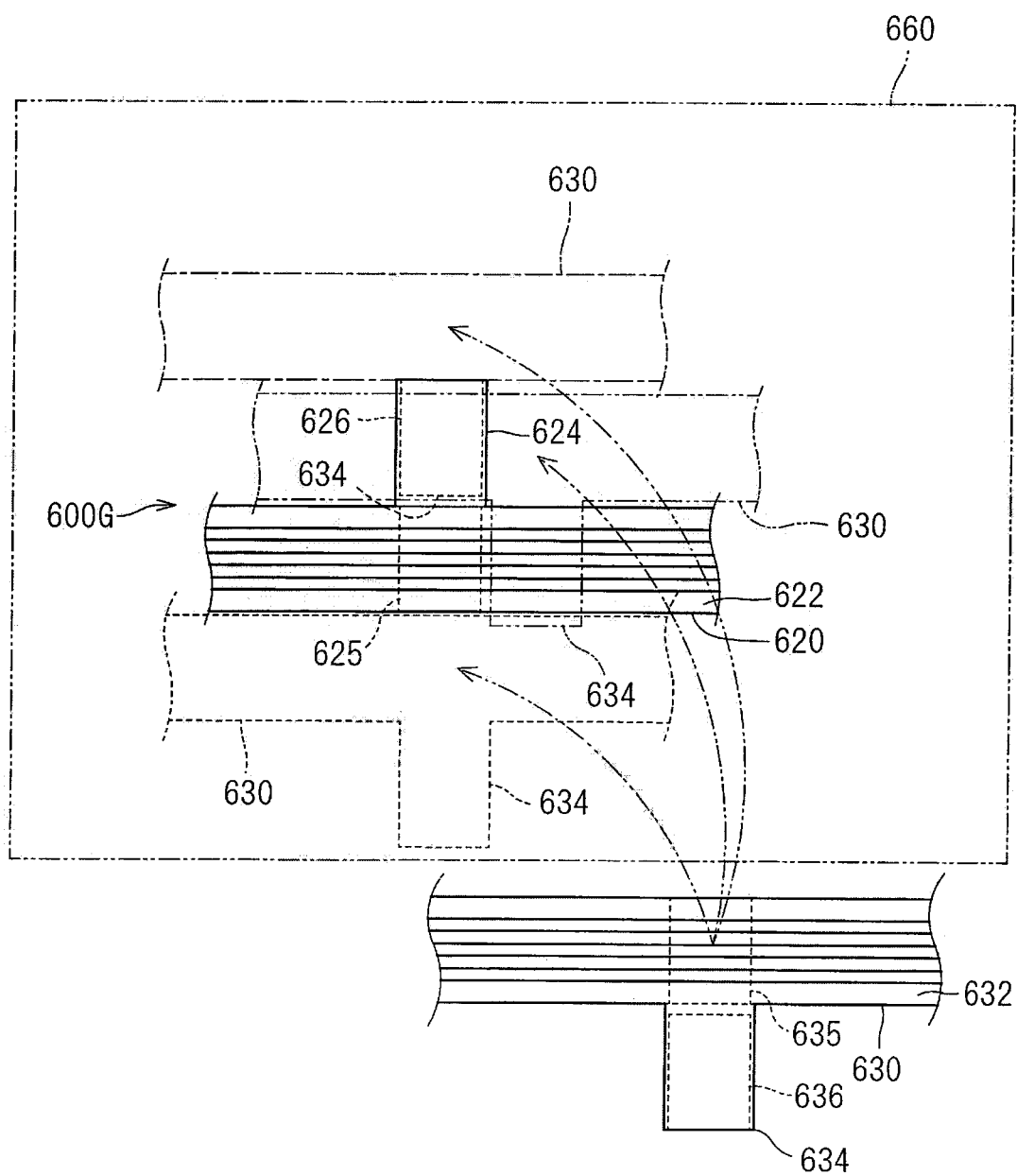
FIG. 35 An explanation diagram illustrating another example of the composite wiring module in which the base wiring module and the additional wiring module are fixed to the fixing target member.

Alternatively, as illustrated in FIG. 35, the pressure-sensitive adhesive part 635 sticks to the fixing target member 660 while the protruding portion 634 is positioned in a diagonal inward position (refer to the additional wiring module 630 indicated by an alternate long and two short dashes line), an overlapping position (refer to the additional wiring module 630 indicated by an alternate long and short dash line), and a base end outward position (refer to the additional wiring module 630 indicated by a dotted line) with respect to the protruding portion 634 in a state where the protruding portion 624 of the base wiring module 620 and the protruding portion 624 of the additional wiring module 630 are arranged in an opposite direction, thus the additional wiring module 630 can be fixed to the fixing target member 660. The base wiring module 620 and the additional wiring module 630 are thereby integrated with each other with the fixing target member 660 therebetween, and are manufactured as a composite wiring module 600G.

According to the present embodiment, at least a part of the additional wiring module 630 is disposed along the base wiring module 620 in the state where the protruding portion 624 of the base wiring module 620 corresponds to the protruding portion 634 of the additional wiring module 630. Thus, when the additional wiring module 630 is added to the base wiring module 620, a positional relationship between them can be set as constant as possible.

MODIFICATION EXAMPLE

Each configuration described in the above embodiments and modification examples thereof can be appropriately combined as long as they are not contradictory.

For example, the pressure-sensitive adhesion structure between the pressure-sensitive adhesive part and the peeling part described in the first embodiment described above and the pressure-sensitive adhesion structure between the pressure-sensitive adhesive part and the peeling part described in the second or third embodiment can be used in combination.

A wiring module including an extension piece extending from at least one side portion of the sheet body part or a wiring module including an pressure-sensitive adhesive part or a peeling part extending from one side of the sheet-like portion can be used as an indication to make a fixing position constant not only in a case where a wire is added to the base wiring module but also in a case where the wiring module is fixed to a fixing target. For example, the wiring module is fixed to the fixing target so that the extending portion described above is disposed in a certain position in a duct for an air conditioner, an edge, corner, or uneven shape of a roof lining, an integration portion of a sun roof, an integration portion of an apparatus such as an air conditioner operation panel, for example. Thus, the wiring module can be fixed to the certain position in the fixing target as reliably as possible.

Although the present invention is described in detail, the foregoing description is in all aspects illustrative and does not restrict the invention. It is therefore understood that numerous modifications and variations can be devised without departing from the scope of the invention.

EXPLANATION OF REFERENCE SIGNS 20, 220, 320, 420, 420B, 520, 520B wiring module
22, 22B, 422, 522 wiring body
24, 24B, 424, 524 sheet-like member
26, 26B, 621, 631 electrical wire
27 core wire
30, 230, 230B, 430, 430B, 530, 530B, 625, 635 pressure-sensitive adhesive part
40, 240, 240B, 440, 440B, 540, 540B, 626, 636 peeling part
60, 460, 560, 660 fixing target member
70, 470, 570 fixing target member equipped with wiring module
360 roof lining
370 roof lining equipped with wiring module
424b extension piece
531B base material
532B pressure-sensitive adhesive layer
538B pressure-sensitive adhesive part with peeling part
541 base material
542 peeling surface
543, 543B joint part
548 peeling part with pressure-sensitive adhesive part
600, 600B, 600C, 600D, 600E, 600F, 600G composite wiring module
620 base wiring module
622 band-like sheet portion
624 protruding portion
630 additional wiring module
632 band-like sheet portion
634 protruding portion

The invention claimed is:

1. A wiring module, comprising:
a wiring body including at least one conductive wiring;
a pressure-sensitive adhesive part provided on the wiring body; and
a peel part, provided on the wiring body, to which the pressure-sensitive adhesive part sticks so as to be peelable from the peel part, wherein
the peel part is attached to a part of the wiring body other than a part where the peel part sticks to the pressure-sensitive adhesive part.

2. A wiring module, comprising:
a wiring body including at least one conductive wiring;
a pressure-sensitive adhesive part provided on the wiring body; and
a peel part, provided on the wiring body, to which the pressure-sensitive adhesive part sticks so as to be peelable from the peel part, wherein
the pressure-sensitive adhesive part is partially provided on the wiring body, and
the peel part is partially provided on a part of the wiring body other than a part where the pressure-sensitive adhesive part is provided.

3. The wiring module according to claim 2, wherein
the wiring body has a flat shape, and
the pressure-sensitive adhesive part is provided to planarly spread on one main surface of the wiring body.

4. The wiring module according to claim 2, wherein
the pressure-sensitive adhesive part and the peel part are provided on different parts in the wiring body in an extension direction of the wiring body.

5. The wiring module according to claim 4, wherein
a plural sets of the pressure-sensitive adhesive part and the peel part are provided on different parts in the wiring body in an extension direction of the wiring body.

6. The wiring module according to claim 4, wherein
there is an interval between the pressure-sensitive adhesive part and the peel part sticking to each other.

7. The wiring module according to claim 6, wherein
a part of the wiring body between the pressure-sensitive adhesive part and the peel part sticking to each other is curved and bent back.

8. The wiring module according to claim 2, wherein
in a set of the pressure-sensitive adhesive part and the peel part sticking to each other, another peel part is provided adjacent to the pressure-sensitive adhesive part and another pressure-sensitive adhesive part is provided adjacent to the peel part, and the another peel part and the another pressure-sensitive adhesive part stick to each other so as to be from each other.

9. The wiring module according to claim 1, wherein
the wiring body includes a sheet-like member including a sheet body part to which the at least one conductive wiring is fixed and an extension piece extending from at least one side portion of the sheet body part, and is formed into a flat shape as a whole,
one of the pressure-sensitive adhesive part and the peel part is provided on one main surface of the sheet body part and another one of the pressure-sensitive adhesive part and the peel part is provided on the extension piece, and
the peel part sticks to the pressure-sensitive adhesive part so as to be peelable from the pressure-sensitive adhesive part in a condition where the extension piece is bent.

10. The wiring module according to claim 1, wherein
the wiring body includes a sheet-like member to which the at least one conductive wiring is fixed, and is formed into a flat shape as a whole, and
one of the pressure-sensitive adhesive part and the peel part is provided on one main surface of the sheet-like member, another one of the pressure-sensitive adhesive part and the peel part is attached to the sheet-like member while extending from one side portion of the sheet-like member, and the peel part sticks to the pressure-sensitive adhesive part so as to be peelable from the pressure-sensitive adhesive part in a condition where a part of the pressure-sensitive adhesive part and the peel part extending from one side portion of the sheet-like member is bent 11. The wiring module according to claim 1, wherein
a joint part is provided on a part of one main surface of the peel part, and the pressure-sensitive adhesive part is provided on a part of another main surface of the peel part, and
in a condition where the peel part is attached to the wiring body with the joint part therebetween, the peel part is bent and a part of the another main surface of the peel part where the pressure-sensitive adhesive part is not provided sticks to the pressure-sensitive adhesive part so as to be peelable from the pressure-sensitive adhesive part.

12. A composite wiring module, comprising
the wiring module according to claim 1 as a base wiring module and the wiring module according to claim 1 as an additional wiring module, wherein
at least a part of the additional wiring module is disposed along the base wiring module in a condition where a part of the additional wiring module protruding to an outside of the wiring body is made to correspond to a part of the base wiring module extending to an outside of the wiring body.

13. A wiring module, comprising:
a wiring body including at least one conductive wiring;
a pressure-sensitive adhesive part provided on the wiring body; and
a peel part, provided on the wiring body, to which the pressure-sensitive adhesive part is configured to stick so as to be peelable from the peel part, wherein
the pressure-sensitive adhesive part is partially provided on the wiring body, and
the peel part is partially provided on a part of the wiring body other than a part where the pressure-sensitive adhesive part is provided.

14. A fixing target member equipped with a wiring module, comprising:
the wiring module according to claim 13; and
a fixing target member to which the wiring body is fixed with the pressure-sensitive adhesive part therebetween while the peel part remains on the wiring body.

15. The composite wiring module according to claim 12, wherein
in the base wiring module and additional wiring module, the wiring body includes a sheet-like member including a sheet body part to which the at least one conductive wiring is fixed and an extension piece extending from at least one side portion of the sheet body part, and is formed into a flat shape as a whole, one of the pressure-sensitive adhesive part and the peel part is provided on one main surface of the sheet body part and another one of the pressure-sensitive adhesive part and the peel part is provided on the extension piece, and the peel part sticks to the pressure-sensitive adhesive part so as to be peelable from the pressure-sensitive adhesive part in a condition where the extension piece is bent.

16. The composite wiring module according to claim 12, wherein
in the base wiring module and additional wiring module, the wiring body includes a sheet-like member to which the at least one conductive wiring is fixed, and is formed into a flat shape as a whole, and one of the pressure-sensitive adhesive part and the peel part is provided on one main surface of the sheet-like member, another one of the pressure-sensitive adhesive part and the peel part is attached to the sheet-like member while extending from one side portion of the sheet-like member, and the peel part sticks to the pressure-sensitive adhesive part so as to be peelable from the pressure-sensitive adhesive part in a condition where a part of the pressure-sensitive adhesive part and the peel part extending from one side portion of the sheet-like member is bent.

17. The composite wiring module according to claim 12, wherein
in the base wiring module, the wiring body includes a sheet-like member including a sheet body part to which the at least one conductive wiring is fixed and an extension piece extending from at least one side portion of the sheet body part, and is formed into a flat shape as a whole, one of the pressure-sensitive adhesive part and the peel part is provided on one main surface of the sheet body part and another one of the pressure-sensitive adhesive part and the peel part is provided on the extension piece, and the peel part sticks to the pressure-sensitive adhesive part so as to be peelable from the pressure-sensitive adhesive part in a condition where the extension piece is bent, and
in the additional wiring module, the wiring body includes a sheet-like member to which the at least one conductive wiring is fixed, and is formed into a flat shape as a whole, and one of the pressure-sensitive adhesive part and the peel part is provided on one main surface of the sheet-like member, another one of the pressure-sensitive adhesive part and the peel part is attached to the sheet-like member while extending from one side portion of the sheet-like member, and the peel part sticks to the pressure-sensitive adhesive part so as to be peelable from the pressure-sensitive adhesive part in a condition where a part of the pressure-sensitive adhesive part and the peel part extending from one side portion of the sheet-like member is bent.

18. The composite wiring module according to claim 12, wherein
in the additional wiring module, the wiring body includes a sheet-like member including a sheet body part to which the at least one conductive wiring is fixed and an extension piece extending from at least one side portion of the sheet body part, and is formed into a flat shape as a whole, one of the pressure-sensitive adhesive part and the peel part is provided on one main surface of the sheet body part and another one of the pressure-sensitive adhesive part and the peel part is provided on the extension piece, and the peel part sticks to the pressure-sensitive adhesive part so as to be peelable from the pressure-sensitive adhesive part in a condition where the extension piece is bent, and
in the base wiring module, the wiring body includes a sheet-like member to which the at least one conductive wiring is fixed, and is formed into a flat shape as a whole, and one of the pressure-sensitive adhesive part and the peel part is provided on one main surface of the sheet-like member, another one of the pressure-sensitive adhesive part and the peel part is attached to the sheet-like member while extending from one side portion of the sheet-like member, and the peel part sticks to the pressure-sensitive adhesive part so as to be peelable from the pressure-sensitive adhesive part in a condition where a part of the pressure-sensitive adhesive part and the peel part extending from one side portion of the sheet-like member is bent.

* * * * *

UNITED STATES PATENT AND TRADEMARK OFFICE
CERTIFICATE OF CORRECTION

PATENT NO. : 11,167,702 B2
APPLICATION NO. : 16/605638
DATED : November 9, 2021
INVENTOR(S) : H. Mizuno et al.

It is certified that error appears in the above-identified patent and that said Letters Patent is hereby corrected as shown below:

On the Title Page

Item [57], Line 2, change "an pressure-sensitive" to -- a pressure-sensitive --

In the Claims

Column 30, Line 19 (Claim 5) change "a plural sets" to -- plural sets --

Column 30, Line 37 (Claim 8) change "be from" to -- be peelable from --

Column 30, Line 67 (Claim 10) change "is bent" to -- is bent. --

Signed and Sealed this
Seventeenth Day of May, 2022

Katherine Kelly Vidal
*Director of the United States Patent and Trademark Office*